(12) United States Patent
Friesen et al.

(10) Patent No.: US 7,099,271 B2
(45) Date of Patent: Aug. 29, 2006

(54) SYSTEM FOR PROVIDING FABRIC ACTIVITY SWITCH CONTROL IN A COMMUNICATIONS SYSTEM

(75) Inventors: Larry Friesen, Nepean (CA); Joseph Soetemans, Nepean (CA)

(73) Assignee: Alcatel Canada Inc., Kanata (CA)

( * ) Notice: Subject to any disclaimer, the term of this patent is extended or adjusted under 35 U.S.C. 154(b) by 854 days.

(21) Appl. No.: 10/015,576

(22) Filed: Dec. 17, 2001

(65) Prior Publication Data

US 2003/0119555 A1 Jun. 26, 2003

(30) Foreign Application Priority Data

Sep. 27, 2001 (CA) .................................. 2,357,913

(51) Int. Cl.
*H04L 1/22* (2006.01)
(52) U.S. Cl. ........................................ 370/218; 370/244
(58) Field of Classification Search ................ 370/218, 370/219, 220, 242, 244
See application file for complete search history.

(56) References Cited

U.S. PATENT DOCUMENTS 6,052,373 A * 4/2000 Lau ............................ 370/399
6,078,595 A * 6/2000 Jones et al. .................. 370/503
6,226,261 B1 * 5/2001 Hurtta et al. ................. 370/219
6,442,133 B1 * 8/2002 Owada ........................ 370/219
6,850,704 B1 * 2/2005 Dave .............................. 398/2
6,894,969 B1 * 5/2005 Chidambaran et al. ...... 370/216
2002/0099972 A1 * 7/2002 Walsh et al. ................... 714/10

* cited by examiner

*Primary Examiner*—Min Jung
(74) *Attorney, Agent, or Firm*—McCarthy Tetrault LLP

(57) ABSTRACT

Disclosed is a system for providing redundancy on a communications switch platform having a data plane for processing data. The data plane includes an active fabric having an ingress and an egress and establishing a first datapath, a redundant fabric having an ingress and an egress and establishing a second datapath, and a fabric switch for aligning the egress of one of said fabrics to a system output. A separate and independent control plane is provided for monitoring the processing of data. The control plane includes: (i) a plurality of monitors operatively connected to monitor the status of the active and redundant fabrics in the data plane for a fault; and (ii) a fabric activity switch circuit adapted to determine whether the fault occurred in the active fabric in the data plane, and if so, to generate a fabric activity switch signal directed to said fabric switch in the data plane.

16 Claims, 17 Drawing Sheets

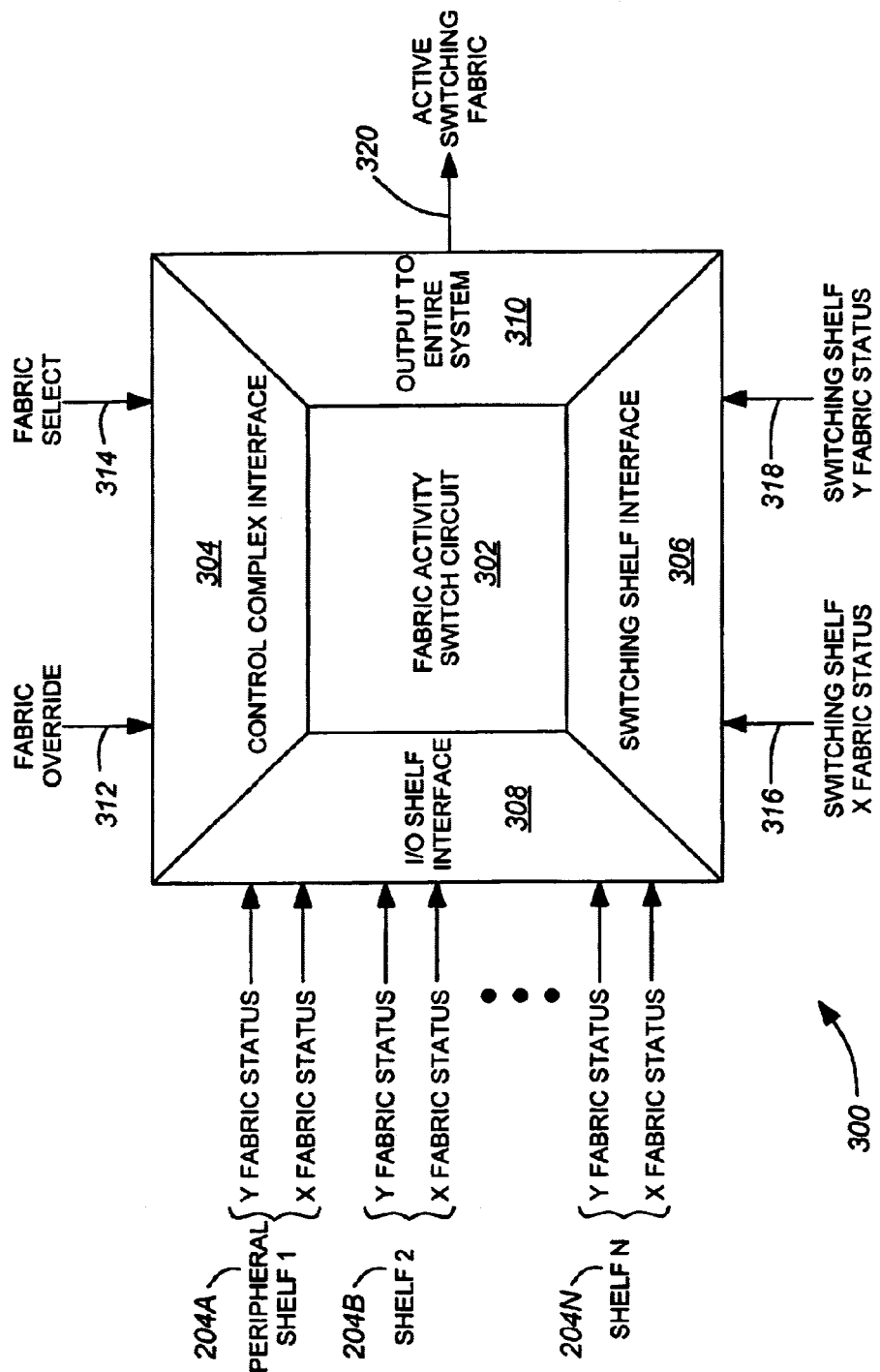

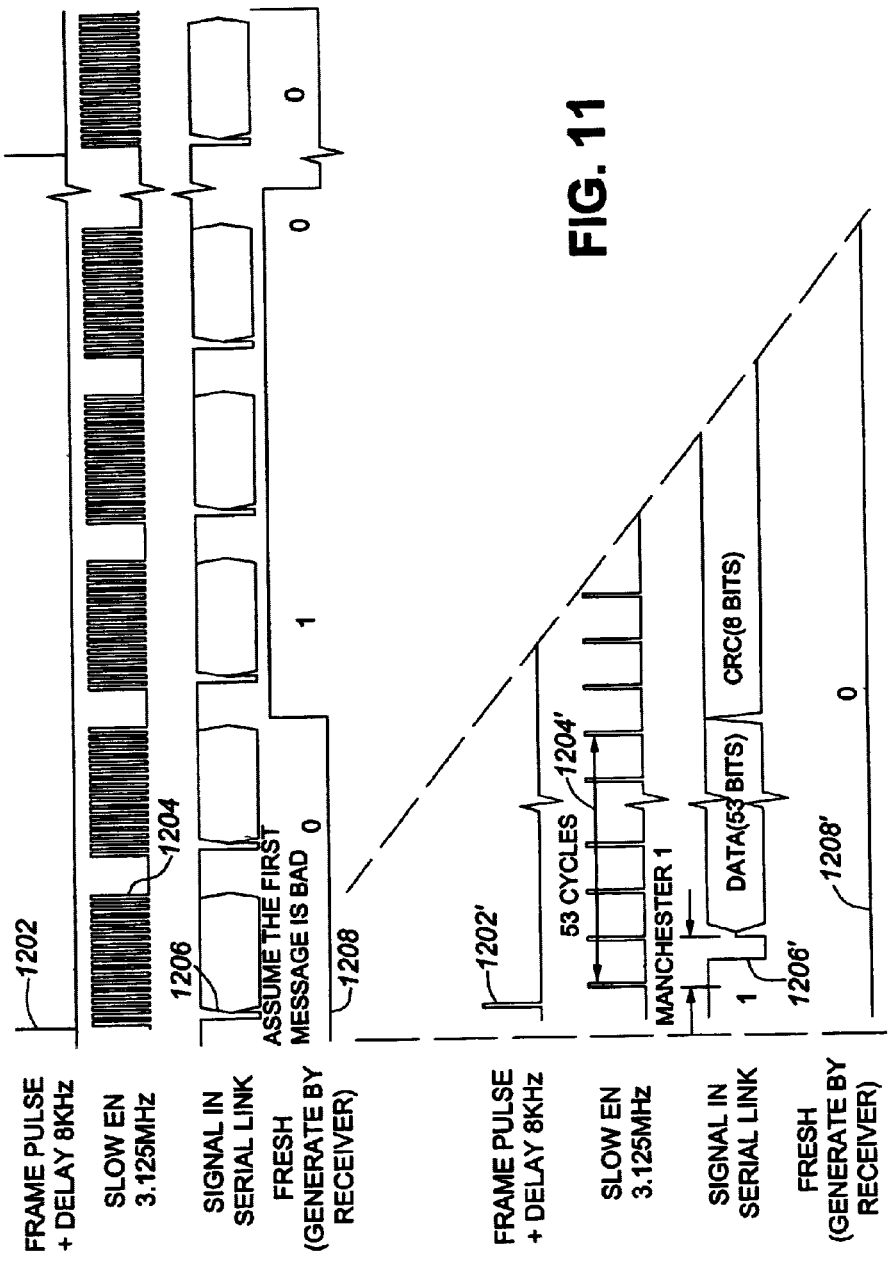

SYSTEM FOR PROVIDING FABRIC ACTIVITY SWITCH CONTROL IN A COMMUNICATIONS SYSTEM

FIELD OF THE INVENTION

The invention relates to a system for providing fabric redundancy and activity switch control in a communications system, in particular in a routing switch platform.

BACKGROUND OF INVENTION

Many communication switch and router systems architectures provide redundant communications capabilities. Redundancy in a router system can be provided on two levels A first level provides redundancy within a single shelf for a communications switch. Therein, two or more modules provide redundant communications capabilities for another communication module on the same shelf. A second type of redundancy provides fabric redundancy beyond the switch matrix (SMX) cards and includes fabric interface cards (FICs) installed on input/output (I/O) shelves, high-speed inter-shelf links (HISLs), cables connecting I/O shelves and switch access cards (SACs) installed in switching shelves.

Prior art designs exhibit some inherent limitations. For example, in certain prior art designs, the redundant fabrics may be interconnected and may co-depend on each other to effect an activity switch between the fabrics. This co-dependency between the redundant fabrics may be problematic, depending on the type of fault that is initiating the activity switch between the fabrics. Furthermore, in prior art designs, the time it takes to execute an activity switch between redundant fabrics may be in the order of several seconds or more, which may not comply with industry standards for certain switching applications.

For routing switch platforms used for telecommunications applications, for example, the current Bellcore standard GR-1110-CORE mandates that an activity switch must be completed within 60 ms upon detection of a first fault in any switching fabric. Many prior art designs do not meet this Bellcore standard for an activity switch upon a first fault.

Accordingly, there is a need for an improved system for providing fabric redundancy and executing a fabric activity switch which overcomes the limitations in the prior art, and which meets or exceeds industry standards such as Bellcore standard GR-1110-CORE.

SUMMARY OF INVENTION

In order to overcome the limitations in the prior art, the present invention provides activity switch control functions on a control plane which are separate and independent of data switching functions on a data plane. Separation of the control plane and data plane in accordance with the present invention allows a robust, distributed architecture, capable of providing redundancy both within the data plane and within the control plane. Furthermore, the separate and independent control plane and a hardware-centric switching implementation allows significantly improved fabric activity switchover times in comparison to prior art software-centric implementations.

Accordingly, in a first aspect, the present invention provides a system for controlling switching fabrics in a communications switch platform having a data plane for processing data, including an active fabric having an ingress and an egress and establishing a first datapath, a redundant fabric having an ingress and an egress and establishing a second datapath, and a fabric switch selecting one of said fabrics to a system output, comprising:

a control plane for monitoring said processing of data, including:

(i) a plurality of monitors operatively connected to monitor the status of elements in said active and redundant fabrics in the data plane; and (ii) a first fabric activity switch circuit adapted to determine whether said fault occurred in said active fabric, and if so, to generate a fabric activity switch signal directed to said fabric switch to switch to said redundant fabric, whereby, the control plane receives data plane fabric status inputs from the data plane and effects control over said fabric switch, but otherwise operates independently of said data plane.

In an embodiment, the system may further comprise a redundant fabric activity switch circuit which, in the event of failure of said first fabric activity switch circuit, is adapted to determine whether said fault occurred in said active fabric in the data plane, and if so, to generate a fabric activity switch signal directed to said fabric switch, whereby, redundant control is provided over said fabric switch.

In another embodiment, the system may further comprise a plurality of redundant monitors operatively connected to monitor the status of said first fabric and said redundant fabric for a fault, whereby, redundant reporting paths are provided in the control plane for the status of said first and said redundant fabrics.

In yet another embodiment, the plurality of monitors and redundant monitors comprise a pair of shelf controllers per shelf, and each monitor and each redundant monitor of each pair of shelf controllers is connected by respective control service links to a first inter-shelf I/O interface card and a second inter-shelf I/O interface card, respectively, whereby shelf status information is provided across shelves to redundant I/O interfaces.

In another embodiment, the system may further comprise first and second inter-shelf management cards, each of said first and second inter-shelf management cards being cross-connected to each of said first and second inter-shelf I/O interface cards, whereby, multiple redundant paths are provided between said pairs of shelf controllers and said inter-shelf management cards.

In still another embodiment, the system may further comprise first and second fabric activity switch control cards, each of said first and second fabric activity switch control cards being cross-connected to each of said first and second inter-shelf management cards, whereby, multiple redundant paths are provided between said pairs of shelf controllers and said fabric activity switch control cards.

In another embodiment the system may further comprise a fabric override input adapted to generate a fabric activity switch signal directed to said fabric switch in the data plane, whereby, the selection of a fabric by the fabric activity switch circuit may be overridden.

According to one aspect of the invention, there is provided a system for controlling switching fabrics in a communications switch platform having a data plane for processing data, including an active fabric having an ingress and an egress and establishing a first datapath, a redundant fabric having an ingress and an egress and establishing a second datapath, and a fabric switch selecting one of said fabrics to a system output, comprising: a control plane for monitoring said processing of data, including: (i) a plurality of monitors operatively connected to monitor the status of elements in said active and redundant fabrics in the data plane; and (ii) a first fabric activity switch circuit adapted to determine whether said fault occurred in said active fabric, and if so, to generate a fabric activity switch signal directed to said fabric switch to switch to said redundant fabric, whereby, the control plane receives data plane fabric status inputs from the data plane and effects control over said fabric switch, but otherwise operates independently of said data plane; a redundant fabric activity switch circuit which, in the event of failure of said first fabric activity switch circuit, is adapted to determine whether said fault occurred in said active fabric in the data plane, and if so, to generate a fabric activity switch signal directed to said fabric switch, whereby, redundant control is provided over said fabric switch; a plurality of redundant monitors operatively connected to monitor the status of said first fabric and said redundant fabric for a fault, whereby, redundant reporting paths are provided in the control plane for the status of said first and said redundant fabrics; and, wherein said plurality of monitors and redundant monitors comprise a pair of shelf controllers per shelf, and each monitor and each redundant monitor of each pair of shelf controllers is connected by respective control service links to a first inter-shelf I/O interface card and a second inter-shelf I/O interface card, respectively, whereby shelf status information is provided across shelves to redundant I/O interfaces. The system may further include first and second inter-shelf management cards, each of said first and second inter-shelf management cards being cross-connected to each of said first and second inter-shelf I/O interface cards, whereby, multiple redundant paths may be provided between said pairs of shelf controllers and said inter-shelf management cards. The system may further include first and second fabric activity switch control cards, each of said first and second fabric activity switch control cards being cross-connected to each of said first and second inter-shelf management cards, whereby, multiple redundant paths may be provided between said pairs of shelf controllers and said fabric activity switch control cards. The system may further include a fabric override input adapted to generate a fabric activity switch signal directed to said fabric switch in the data plane, whereby, the selection of a fabric by the fabric activity switch circuit may be overridden. The system may further include a fabric override input adapted to generate a fabric activity switch signal directed to said fabric switch in the data plane, whereby, the selection of a fabric by the fabric activity switch circuit may be overridden. And, the system may further include a fabric override input adapted to generate a fabric activity switch signal directed to said fabric switch in the data plane, whereby, the selection of a fabric by the fabric activity switch circuit may be overridden.

According to another aspect of the invention, there is provided a system for controlling switching fabrics in a communications switch including a plurality of input/output ("I/O") shelves interfacing with a first switching fabric and a second switching fabric, for selecting one of said first and second fabrics as an active switching fabric, comprising: an I/O monitor provided in an access interface between each I/O shelf and the first and second switching fabrics, respectively, for generating respective first and second fabric status signals indicative of a fault on the access interface; means in the first and second fabrics for generating respective first and second switching fabric status signals, indicative of a fault in one of the first and second switching fabrics, respectively; and, a fabric activity switch circuit for selecting the first switching fabric as the active switching fabric if a fault is detected in the second switching fabric based on the first and second fabric status signals and the first and second switching fabric status signals. The system may further include an interface, coupled to the fabric activity switch circuit, for receiving at least one of an override signal for overriding the selecting of the active switching fabric and a select signal for directing the selecting of the active switching fabric. In the system, at least one of the override and select signals may be provided by a control terminal. And, the selecting of the active switching fabric may occur in under 60 milliseconds.

According to another aspect of the invention, there is provided a fabric activity switch circuit for a communications switch, the communications switch including at least one input/output ("I/O") device coupled to each of first and second switching fabrics, the circuit comprising: a first interface for receiving first and second I/O status signals from the at least one I/O device, the first and second I/O status signals being indicative of respective faults in the first and second switching fabrics and being generated by respective monitors provided in the at least one I/O device; a second interface for receiving first and second fabric status signals from the first and second switching fabrics, respectively, the first and second fabric status signals being indicative of respective faults in the first and second switching fabrics and being generated by respective monitors provided in the first and second switching fabrics; gates coupled to the first and second interfaces for generating an output signal for selecting the first switching fabric as an active switching fabric if a combination of the second I/O and fabric status signals indicate a fault in the second switching fabric and for selecting the second switching fabric as the active switching fabric if a combination of the first I/O and fabric status signals indicate a fault in the first switching fabric. The fabric activity switch circuit may further include a third interface coupled to the gates for transmitting the output signal to a fabric switch for switching between the first and second switching fabrics. The fabric activity switch circuit may further include redundant gates and redundant first, second, and third interfaces to improve reliability. The fabric activity switch circuit may further include a fourth interface, coupled to the gates, for receiving at least one of an override signal for overriding the selecting of the active switching fabric and a select signal for directing the selecting of the active switching fabric. In the fabric activity switch circuit, at least one of the override and select signals may be provided by a control terminal. And, the switching between the first and second switching fabrics may occur in under 60 milliseconds.

In other aspects various combinations and subsets of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention In the drawings, where like elements feature like reference numerals (and wherein individual elements bear unique alphabetical suffixes):

FIG. 3 is a block diagram showing the architecture for a fabric activity switch system and circuit, in accordance with an embodiment, integrated into the routing switch platform of FIGS. 2A–2C;

FIG. 11 is a timing diagram of an inter-shelf connection serial broadcast (ICSB) link data transmission used in the fabric activity determination system and circuit, in accordance with an embodiment of FIG. 3;

DETAILED DESCRIPTION OF THE EMBODIMENTS

Figure 1:
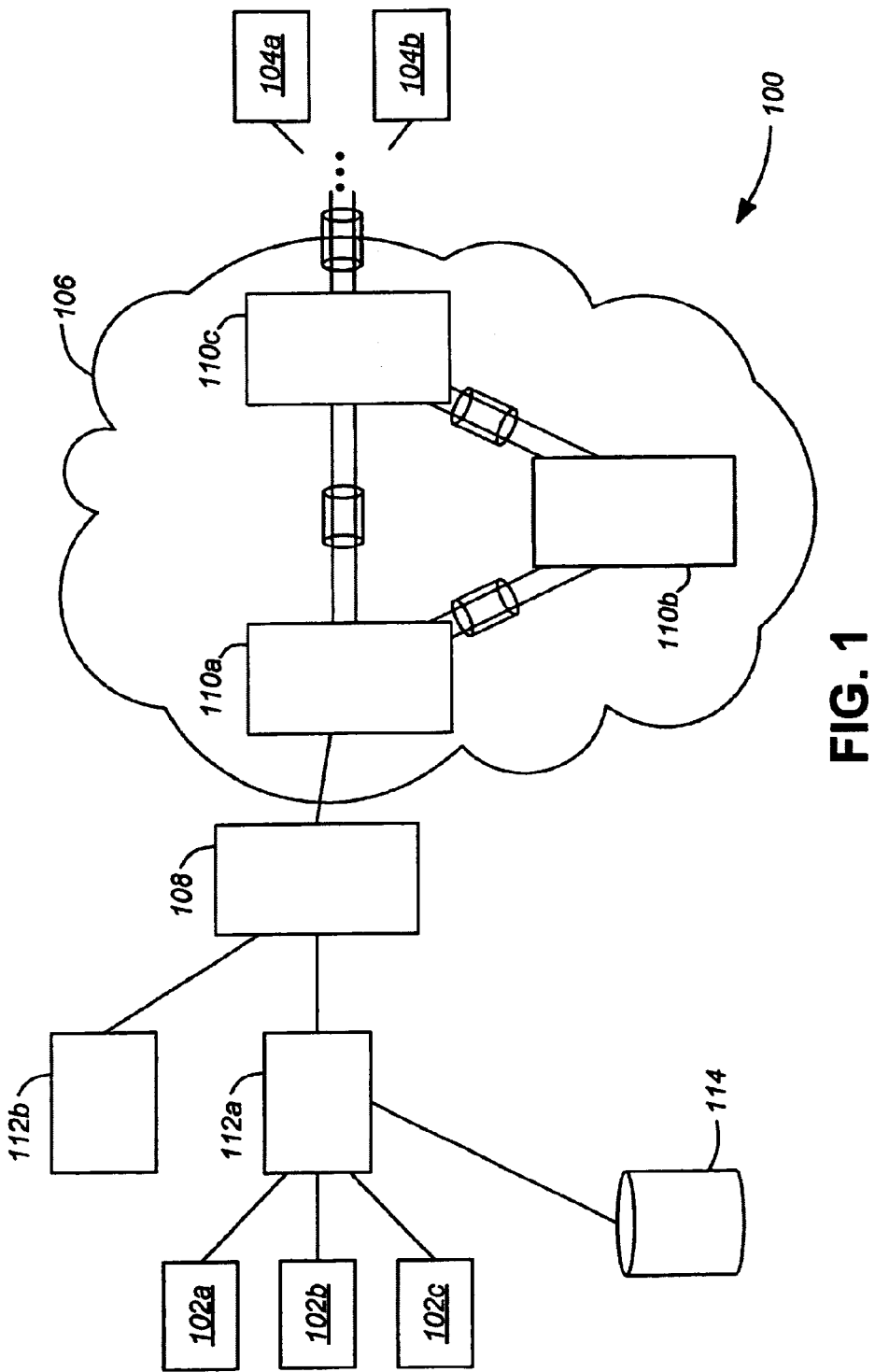
FIG. 1 is a block diagram of a communication network, utilizing a routing switch platform which integrates a fabric activity switch system embodying the invention.

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

The terms as used in this description have the definitions as set out in Table A, below. Trade marks are specified.

TABLE A

| Term | Definition |
| --- | --- |
| ATM | Asynchronous Transfer Mode |
| CC | Control Complex |
| CIC | Control Interconnect Card |
| CRC | Cyclic Redundancy Check |
| CSL | Control Service Link |
| DFIC | Dual Fabric Interface Cards |
| FAC | Facilities Access Card |
| FSM | Finite State Machine |
| FIC | Fabric Interface Card |
| FPGA | Field Programmable Gate Array |
| Gbps | Giga bits per second |
| HFIC | High Speed Fabric Interface Card |
| HISL | High Speed Inter Shelf Link |
| HSC | High Speed Shelf Controller |
| HSLP | High Speed Line Processing |
| HSPS | High Speed Peripheral Shelf |
| ICON | Inter Shelf Connection |
| ICSB | Inter Shelf Connection Serial Broadcast |
| IP | Internet Protocol |
| LFSR | Linear Feedback Shift Register |
| LPC | Line Processing Card |
| LSB | Least Significant Byte |
| Manchester Decoder | Manchester code is a physical layer-encoding scheme found in Local Area Networks such as Ethernet and Token Ring |
| MSB | Most Significant Byte |
| PFIC | Peripheral Fabric Interface Cards |
| PS | Peripheral Shelf |
| QFIC | Quad Fabric Interface Cards |
| SAC | Switch Access Card |
| SCH | Switching Scheduler Card |
| SE | Slow Enable |
| SS | Switching Shelf |
| ST | Serial Telecom |
| SMX | Switch Matrix |
| SSC | Switching Shelf Controller |

1.0 Basic Features of System

In an embodiment, the fabric activity switch system and method embodying the invention may comprise one of two types of switchovers which may occur on a routing switch platform. The first type of switchover may be performed when the active datapath and the redundant datapath are operating without any recent errors, and an error is first detected in one of the datapaths or fabrics. If the error occurs in the active fabric, a switchover is performed by the fabric activity switch system. As noted above, it may be necessary to complete the fabric activity switch within certain industry standards, such as the Bellcore standard GR-1110-CORE mentioned above. As will be explained in detail further below, in an embodiment of the invention, the fabric activity switch system is implemented in hardware circuitry in order to achieve fast switching times that well exceed the requirements under the Bellcore standard.

A second type of switchover may be performed after the first fault has been detected and a subsequent fault has been detected before all previous faults have been cleared. In the case of multiple faults occurring on more than one fabric, it is necessary to determine which fabric is healthier in order to decide whether an activity switch should be made.

2.0 Network Architecture

The following is an example of a network architecture in which a routing switch platform, integrating a fabric activity switch system embodying the invention, may operate.

Referring to FIG. 1, a communication network 100 is shown. Network 100 allows devices 102A, 102B, and 102C to communicate with devices 104A and 104B through network cloud 106. At the edge of network cloud 106, a routing switch 108 is the connection point for devices 102A, 102B and 102C to network cloud 106. In network cloud 106, a plurality of switches 110A, 110B and 110C are connected forming the communications backbone of network cloud 106. In turn, connections from network cloud 106 connect to devices 104A and 104B.

As noted, routing switch 108 incorporates a redundant fabric activity switch system in accordance with an embodiment of the invention. It will be appreciated that terms such as "routing switch", "routing switch platform", "communication switch", "communication device", "switch" and other terms known in the art may be used interchangeably to describe the routing switch 108. Further, while the fabric activity switch system and method as described herein is suitable for integration with switch platform 108, it will be appreciated that the system and method may also be adapted to virtually any switching system, including switches 110A, 110B and 110C.

Figure 2A:
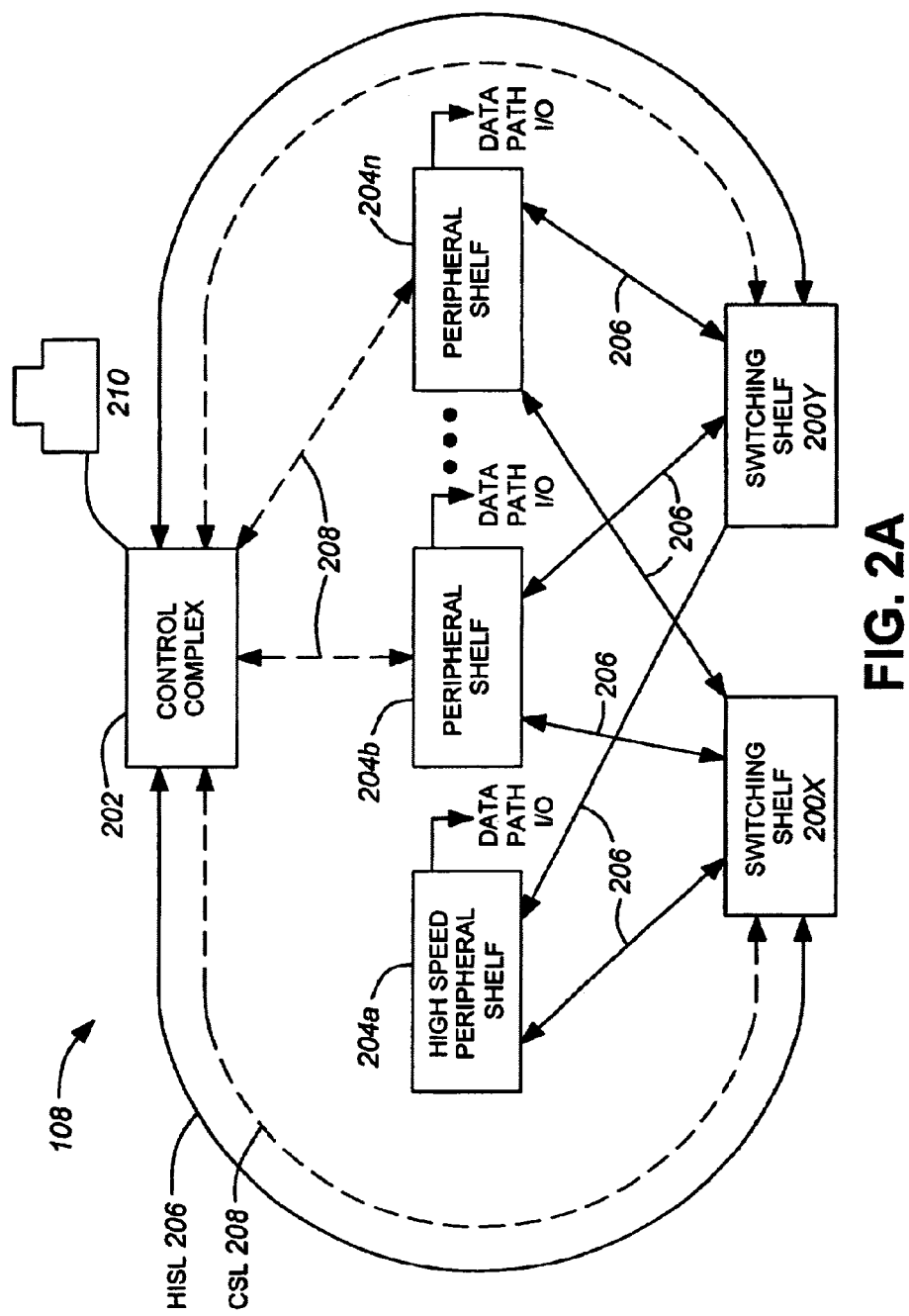
FIG. 2A is a block diagram of certain components of the routing switch platform of FIG. 1.
Figure 2B:
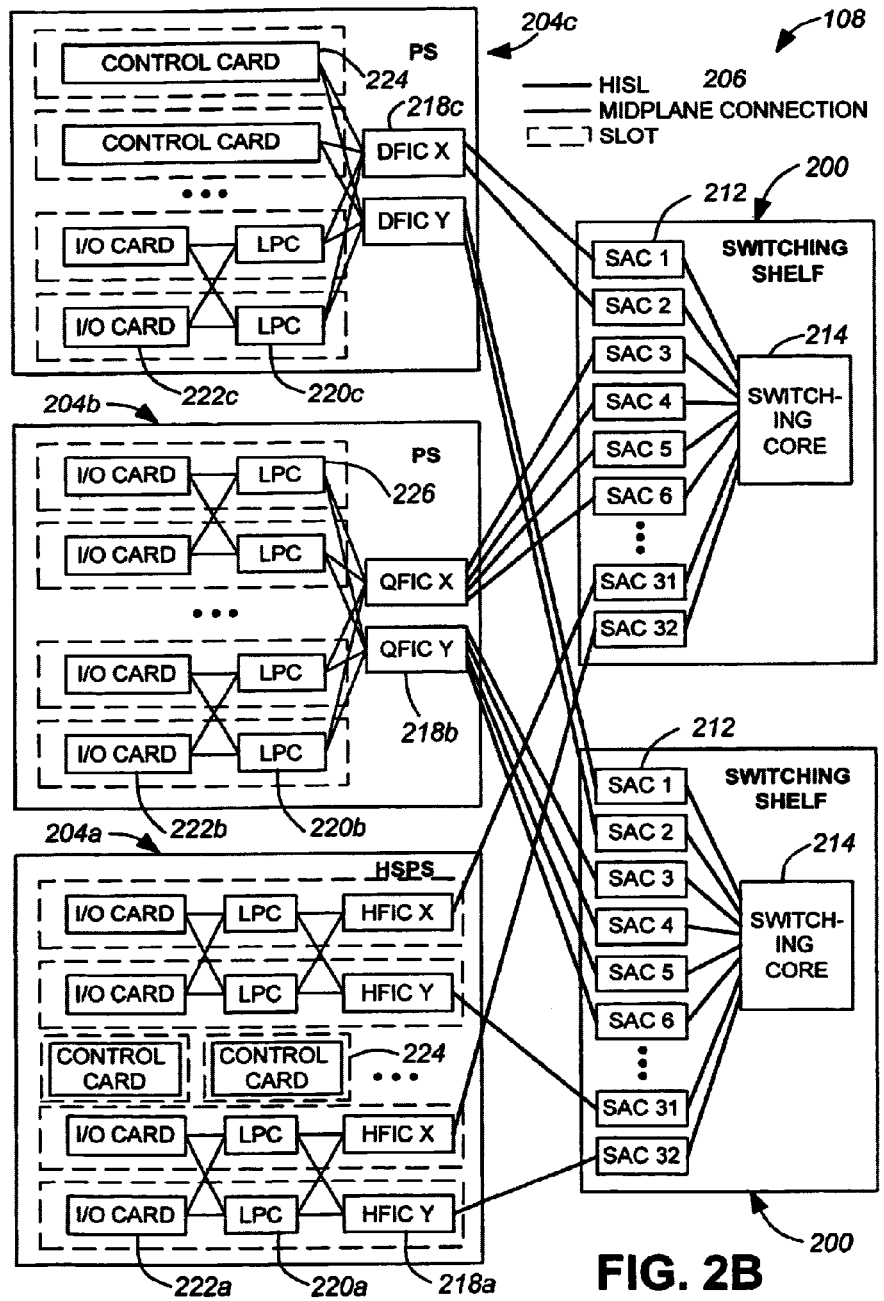
FIG. 2B is a block diagram of certain components and connections of the routing switch platform of FIG. 2A.

Referring now to FIGS. 2A and 2B, routing switch 108 is shown in an embodiment as a multi-protocol routing switch platform which can process both of asynchronous transfer mode (ATM) cells and internet protocol (IP) traffic through its same switching fabrics. In an exemplary embodiment, routing switch 108 allows scaling of the switching fabric capacity from 50 Gbps to 448 Gbps in increments of 14.4 Gbps simply by the insertion of additional shelves into the switch.

In an embodiment, routing switch 108 is a multi-shelf switching system enabling a high degree of re-use of single shelf technologies. As shown in FIGS. 2A and 2B, routing switch 108 comprises two switching shelves (SS) 200X and 200Y, control complex (CC) 202 and peripheral shelves (PS) 204A . . . 204N, (providing, in this exemplary embodiment, a total of 15 peripheral shelves, including a control shelf) and the various shelves and components in routing switch 108 communicate with each other through data links 206, 208. Switching shelves 200X and 200Y provide data cell switching capacity for routing switch 108. Peripheral shelves 204A . . . 204N provide I/O for routing switch 108, allowing connection of devices, such as customer premise devices (CPEs) 102A, 102B, and 102C to routing switch 108 (FIG. 1). Control complex 202 is, in an embodiment, a separate shelf with control cards which provide central management for routing switch 108.

In an embodiment, communication links 206, 208 enable switching shelves 200, peripheral shelves 204 and control complex 202 to communicate data and status information to each other. High-speed inter-shelf links (HISLs) 206 and control service links (CSLs) 208 connect control complex 202 on peripheral shelf 204A with switching shelves 200X and 200Y. HISLs 206 also link switching shelves 200 with peripheral shelves 204. CSLs 208 link control complex 202 with the other peripheral shelves 204B . . . 204N. Terminal 210 is connected to routing switch 108 and runs controlling software which, in an embodiment, allows an operator to modify and control the operation of routing switch 108.

In an embodiment, each switching shelf 200X and 200Y contains a switching fabric core 214 and up to 32 switch access cards (SACs) 212. Each SAC 212 provides 14.4 Gbps of data cell throughput to and from core 214. Each FIC 218 on the peripheral shelves 204 communicates with the rest of the fabric through the SACs 212.

In an embodiment, there are two types of peripheral shelves 204:

The first type is a high-speed peripheral shelf (HSPS), represented as peripheral shelf 204A. HSPS 204A contains high-speed line processing (HSLP) Cards 220A, I/O cards 222A, high-speed fabric interface cards (HFICs) 218A and two redundant high-speed shelf controller (HSC) cards 224.

The second type is a regular peripheral shelf (PS), represented as shelf 204B. PS 204B contains line processing cards (LPCs) 220B, I/O cards 222B and fabric interface cards (FICs) 218B. The fabric interface cards may be configured either as dual fabric interface cards (DFIC) or quad fabric interface cards (QFIC).

Control complex 202 may comprise a master control card, an inter-shelf connection (ICON) management card, an ICON-I/O card, a control interconnect card (CIC), and a facilities (FAC) card for alarms. The ICON-I/O card connects the control shelf to the other shelves in the routing switch platform 108.

Figure 2C:
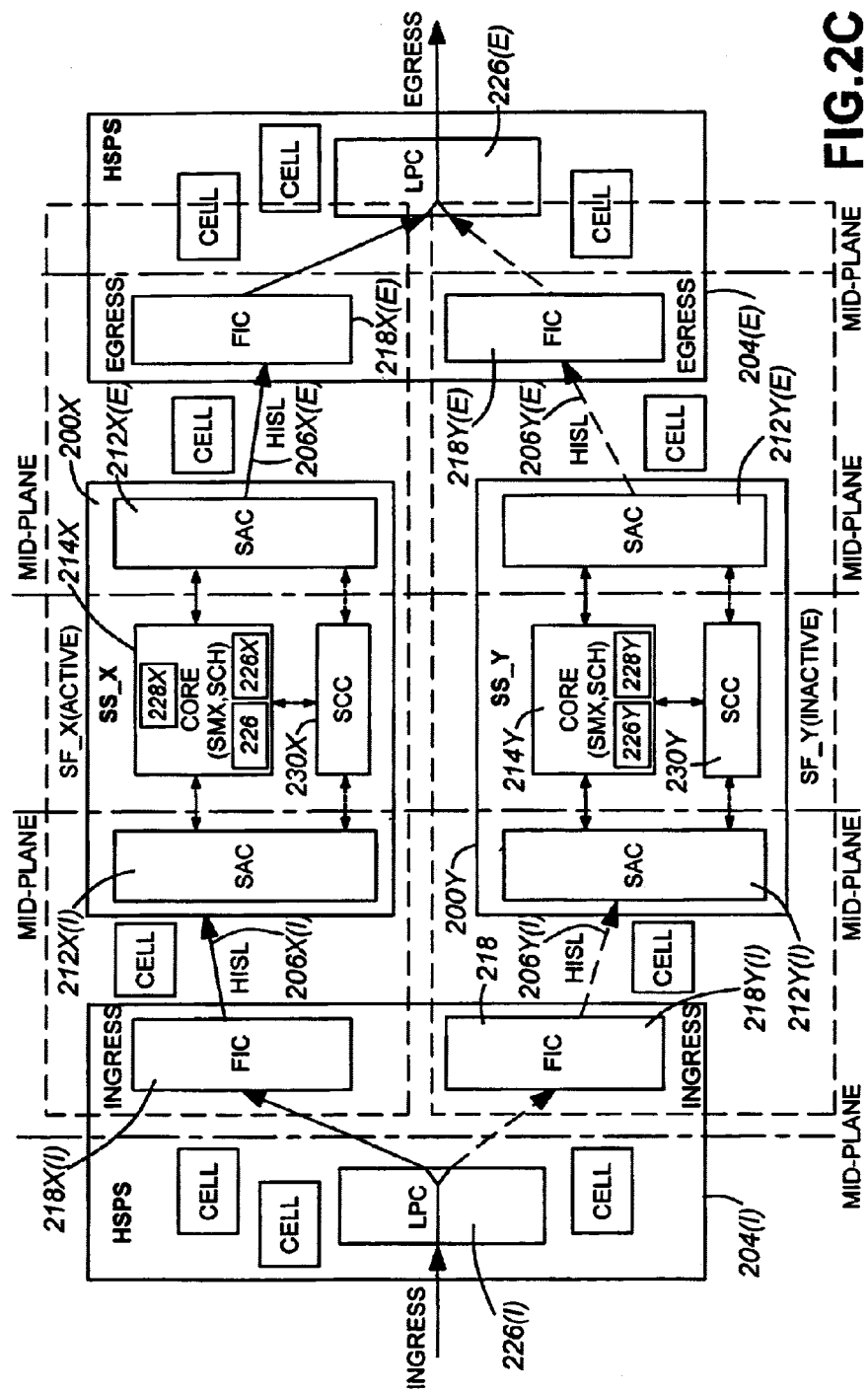
FIG. 2C is a block diagram of traffic flow between components of the routing switch platform of FIGS. 2A and 2B.

FIG. 2C illustrates aspects of an embodiment of the redundant fabrics in routing switch 108. For FIG. 2C, the following convention is used for reference numbers. There are two fabrics, X and Y. Accordingly all elements associated with fabric X have a suffix X associated with it. Similarly all elements associated with fabric Y have a suffix Y associated with it. There is an ingress path and an egress path for each fabric. All elements related to the ingress path have a further (I) suffix associated with it. All elements related to the egress path have a further (E) suffix associated with it.

Redundant switching shelves 200X and 200Y receive data traffic from devices connected to an ingress port of routing switch 108, process the traffic through their respective fabrics, then forward the traffic in the egress direction to the correct egress port. Any traffic which can be sent on switching shelf 200X may also be handled by switching shelf 200Y.

For each core 214 of each switching shelf 200, there may be 6 switching matrix (SMX) cards 226. The set of the 6 SMX cards 226 constitutes a non-blocking 32×32 HISL core of the switching path fabric for one switching shelf 200. Cell switching both to and from all SAC cards 212 occurs across the 6 SMX cards 226. In the embodiment, all 6 SMX cards 226 must be present and configured in order to provide an operational switching core for one switching shelf 200.

Also, each switching core 214 has a switching scheduler card (SCH) 228 which provides centralized arbitration of traffic switching for SS 200 by defining, assigning and processing multiple priorities of arbitration of data traffic processed by the switching fabric of SS 200. Accordingly, the use of the priorities allows routing switch 108 to offer multiple user-defined quality of service levels. SCH 228 must be present and configured to constitute an operating switching core.

In an embodiment, switching shelf 200 has a switching shelf controller (SSC) card 230, which provides a centralized unit responsible for configuring, monitoring and maintaining all elements within SS 200. The SSC 230 controls SACs 212, SMXs 226, SCH 228, and an alarm panel (not shown) and fan control module (not shown) of routing switch 108. It also provides clock signal generation and clock signal distribution to all switching devices within SS 200. Due to its centralized location, SSC 230 is considered to be part of the switching fabric. As a result, any failure in the SSC 230 will trigger a fabric activity switch (details further below). The SSC 230 communicates with the control card 202 via an internal control service link (CSL) 208.

Still referring to FIG. 2C, routing switch 108 handles redundant datapath switching in the following manner: Ingress peripheral shelf 204(I) receives ingress data traffic from device 102 at line processing card (LPC) 226(I). LPC 226(I) forwards the same traffic to both fabric interface cards 218X(I) and 218Y(I). FIC 218X(I) is associated with fabric X and shelf 200X. FIC 218Y(I) is associated with fabric Y and shelf 200Y. Accordingly, peripheral shelf 204(I) provides the traffic substantially simultaneously to both fabric X and fabric Y. It will be appreciated that there may be some processing and device switching delay in peripheral shelf 204(I) preventing exactly simultaneous transmission of traffic to fabrics X and Y.

From FIC 218X(I), the traffic is sent over HISL 206X(I) to shelf 200X; from FIC 218Y(I), the redundant traffic is sent over HISL 206Y(I) to shelf 200Y. In shelf 200X, ingress SACs 212X(I) receive the traffic and forward it to core 214X. The SSC 230X provides clocking and processor control of all elements of the switching shelf X. Once the traffic is sent through core 214X, the traffic is sent in the egress direction to egress SACs 212X(E). The appropriate SAC 212X(E) forwards the traffic on a HISL 206X(E) to egress peripheral shelf 204(E).

At egress, peripheral shelf 204(E), FIC 218X(E) receives the traffic and forwards it to LPC 226E. LPC 226E then transmits the traffic out of routing switch 108. It will be appreciated that a similar processing of traffic occurs in shelf 200Y for traffic received from ingress FIC 218Y(I) over HISL 206Y(I).

Note that two streams of traffic are received at egress peripheral shelf 204(E) from fabric X and Y at LPC 226(E). It is presumed, for this example, that fabric X is the active fabric and fabric Y is the redundant fabric. Accordingly, LPC 226(E) simply selects from which fabric to receive the traffic based on an analysis of the status of both fabrics. Accordingly, in the event of a detection of a fault on the active fabric X, routing switch 108 may quickly switchover to the redundant fabric Y with minimal loss of data traffic which has already been initially processed by the active fabric X. This is because the same traffic has simultaneously been sent through the redundant traffic Y.

In addition to the redundant datapath fabric described above, the embodiment also utilizes a redundant control signalling system. A detailed discussion of the fabric activity switch system embodying the invention that executes the fabric switchover now follows.

3.0 Details of the Fabric Activity Switch System and Method

Referring now to FIG. 3, shown and generally referred to by reference numeral 300 is a fabric activity switch system architecture of a preferred embodiment. In the preferred embodiment, the fabric activity switch architecture 300 provides control functions in a control plane that is separate and independent from data switching functions within the data plane.

More specifically, the fabric activity switch architecture 300 comprises a fabric activity switch circuit 302 having a plurality of interfaces including a control complex interface 304, switching shelf interface 306, I/O shelf interface 308 and an output to system interface 310. While the architecture 300 shows each interface 304, 306, 308, 310 as a single block, it will be appreciated that each interface 304, 306, 308, 310 may comprise a plurality of interfaces, possibly from multiple shelves and systems.

Inputs connected to the control complex interface 304 include a fabric override control input 312 and a fabric select control input 314. The fabric override control input 312 and fabric select control input 314 is associated with control complex 202 described earlier (FIG. 2A) and provides a manual software override control for switch 108, as explained further below.

Inputs to the switching shelf interface 306 include a switching shelf X fabric status input 316 and switching shelf Y fabric status input 318. These switching shelf fabric status inputs 316, 318 represent the current status of each of the active fabric and the redundant fabric in the switching shelves. The processing of these inputs 316, 318 is described in detail further below.

For control information relating to data traffic in the data plane, a plurality of peripheral shelves (PS) 204A . . . 204N may be connected to the I/O shelf interface 308 providing a pathway for fabric status information from each of the respective peripheral shelves 204A . . . 204N. As explained earlier (FIG. 2A), peripheral shelves 204 provide I/O for routing switch 108, allowing connection of devices such as customer premise devices (CPEs) 102A, 102B and 102C (FIG. 1), etc., to routing switch 108.

Finally, an output interface to the system 310 is shown. The output to the system is directed to various components in the routing switch platform 108 adapted to receive a fabric activity switch signal transmitted from the fabric activity switch circuit 302. As will be described in detail with reference to FIGS. 12A–12C, below, the output to the system 310 from the fabric activity switch circuit 302 is a result of processing the various inputs to the fabric activity switch circuit 302.

In the architecture 300 shown in FIG. 3, the fabric activity switching circuit 302 enables communication of status and control information between the various inputs 304, 306, 308 from the system (i.e. the routing switch platform 108) and output 310 to the system. Notably, the fabric override control input 312 and fabric select control input 314 are independent of the fabric status from the peripheral shelves 204A . . . 204N. As described in detail further below, the fabric control inputs 312, 314 facilitate a manual software override of the fabric activity switch circuit 302.

In a preferred embodiment, the fabric activity switch circuit 302 may be physically distributed across multiple shelves and multiple components within a shelf. In such a distributed architecture, in order to achieve a sufficiently fast switchover, any links between each part of the fabric activity switch circuit 302 should meet the following general criteria:

1) Links should deliver control/status data with a minimal and predictable delay.
2) Once a link is operational, hardware (i.e. circuitry) should be able to insert and retrieve control/status data without software intervention.
3) Hardware should be able to detect when any link fails.
4) Hardware should be able to detect and handle control/status data that becomes corrupted.

In a preferred embodiment, peripheral shelves and switching shelves report their fabric status information to the control shelf using the type of link described above. Each I/O shelf reports its X and Y fabric interface status through the I/O shelf interface 308, and each switching shelf (X or Y) reports a combined core and fabric interface status through switching shelf interface 306 to the switching circuit 302.

In the embodiment, a mechanism has been provided for use by the embodiment to detect and report an error in the datapath traffic. As such, the embodiment begins with a report that a first error has occurred on one of the active datapath and the redundant datapath. The embodiment then must determine the identity of the fabric in which the error occurred, namely the active fabric or the redundant fabric. The embodiment utilizes a monitoring system for each corresponding failure point associated with the control plane for the switch to identify the fabric on which the reported error occurs. However, it is also necessary to ensure that the results of the monitoring system do not introduce errant information. For example, if the control fabric misreports the source of the error, then this would lead to errant fabric switchovers and loss of accurate status information regarding the active and redundant fabrics.

While it is possible to provide information in the error report regarding identity of the fabric and location of the error, it is preferable to have this determined in a hardware-centric implementation in the control plane in order to meet the Bellcore standard DR-1110-CORE.

To that end, the embodiment has, on the control plane, a plurality of monitoring elements associated with each potential failure point being monitored by the embodiment. The monitoring elements, in their totality, provide a view of the configuration of the ports for the switch. Accordingly different switches may have different mappings of their configurations.

Still referring to FIG. 3, if a link between an I/O shelf connected to the I/O shelf interface 308 and a control shelf connected to control complex interface 304 fails, then the circuit 302 must identify this error before it declares (i.e. assumes) that the fabric interface status from that I/O shelf is good. This prevents an unnecessary activity switch due to loss of connectivity to the I/O shelf and allows the fabric activity switch circuit 302 to continue operating as normal. However, if a link between a switching shelf connected to switching shelf interface 306 and a control shelf connected to control complex interface 304 fails, then the fabric activity switch circuit 302 will declare that fabric status to be bad. A loss of connectivity to any switching fabric is considered a failure because the state of that fabric is then unknown.

The circuit 302 receives an indication from each I/O shelf connected to the I/O shelves interfaces 308 as to whether or not any of the Fabric Interface Cards (FIC's) on that shelf have a reportable problem. Thus, one I/O shelf may have one failure on an Y fabric FIC card and another I/O shelf may have a failure on all of its X fabric FICs. In this case, the circuit 302 will see these as multiple failures, that is, one on each of the X fabric and the Y fabric. Multiple failures on a single fabric is counted as one fault. For example, multiple faults on the X fabric counts as one X fault, and multiple faults on the Y fabric counts as one Y fault.

In the present embodiment, under normal operating conditions (i.e. no fabric faults) software has the ability to select which fabric is to be active. However, on a first fault, the hardware decision making process in the fabric activity switch circuit 302 will select the fault-free fabric based on its own logic, regardless of the fabric selected by software. If the system is operating correctly, on subsequent faults, the fabric selection is again determined by the software override connected to the control complex interface 304. These operating characteristics are designed to meet the Bellcore standard described earlier, which mandates an activity switch on a first fault within 60 ms.

While the fabric activity switch circuit 302 is designed to react to a first occurrence of a fault only, it will be understood that it is possible to design alternative operating characteristics. For example, when a subsequent fault occurs on the same card from which the fabric activity switch circuit 302 has just switched, a modified fabric activity switch circuit 302 may determine that it is not necessary to execute a further activity switch. In the present embodiment, however, upon a second or subsequent fault the determination is made by software.

3.1 Brief Overview of Fabric Activity Switch Circuit

An overview of the fabric activity switch circuit 302 is now provided. This overview is then followed by a detailed discussion of the fabric activity switch process and mechanism in accordance with the present invention.

Briefly, as discussed, a first fault detected in a fabric will cause the fabric activity switch circuit 302 to check whether a fabric with no fault is presently active. Fabric activity switch 302 has access to a monitoring system for the switch, as configured, for each error monitoring point. In normal operation, the fabric activity determination circuit receives fabric status information from I/O shelves connected to the I/O shelf interface 308, and from switching shelves connected to switching shelf interface 306. On I/O shelves, the status of any fabric interface cards are written to a register in an FPGA. On switching shelves, the shelf status is also written to a register in an FPGA. The status of the fabrics can be encoded for transmission from the FPGA to the fabric activity determination circuit 302 (e.g. as 1 status bit+1 parity bit, odd parity). In operation, the encoded status values may be transmitted from a timeslot assignor in the FPGAs to an El transceiver via an ST-like bus. A decoder within the fabric activity switch circuit receives the encoded status values and decodes the values for processing.

Upon processing the status signals received from the I/O shelves and the switching shelves, a fabric activity switch will be executed by the fabric activity switch circuit 302 if the first fault detected is determined to be on a currently active fabric. After a first fault detection and selection of a fault free fabric, the fabric activity switch circuit 302 is automatically placed into software override mode. This override mode allows software to bypass the hardware decision making process carried out by the fabric activity switch circuit 302, and to initiate a fabric activity switch based on fabric selection by the software. Whenever all fabric faults are cleared, the control complex will give back control to the fabric activity switch circuit 302 so that it can again execute a fabric activity switch upon occurrence of a first fault.

Table B below describes the different scenarios for the status information received from all the connected peripheral I/O shelves and switching shelves. Note that the "X Fabric Status" and "Y Fabric Status" are generic terms to represent the X and Y fabric status reported by the I/O shelves and the switching shelves.

TABLE B

| X - Fabric Status | Y - Fabric Status | Action Taken |
|---|---|---|
| Good | Good | None. This is normal operation. |
| Good | Bad | Fast activity switch to fabric X (if fabric Y was active). |
| Bad | Good | Fast activity switch to fabric Y (if fabric X was active). |

TABLE B-continued

| X - Fabric Status | Y - Fabric Status | Action Taken |
| --- | --- | --- |
| Bad | Bad | None. This condition is left to software override. |

Once the fabric is selected by the fabric activity switch circuit 302, the selection decision is communicated from the control complex in the fabric activity switch circuit 302 to the I/O and switching shelves. Theses I/O shelves and switching shelves then communicate the fabric selection to the appropriate peripheral cards without software intervention. Advantageously, the implementation of the fabric analysis and switching in a hardware circuit greatly improves fabric switchover time over a similar software-centric implementation. This allows execution and completion of an activity switch, upon occurrence of a first fault, that is well within the Bellcore standard of 60 ms mentioned above.

3.2 Multi-Shelf System Hardware

As noted above, the fabric activity switch architecture 300 (FIG. 3) provides a separate control plane that is independent of the layout and distribution of the datapaths or fabrics in the data plane. Advantageously, by providing a separate control plane that is independent of the datapaths and which reduces the complexity of adding or upgrading components, a more flexible layout of the datapaths is possible. This is because the layout of the redundant datapaths or fabrics do not directly affect the layout of the control plane. Thus, for example, the fabric activity switch architecture 300 can easily accommodate multi-shelf system hardware in which linked components or cards comprising redundant datapaths or fabrics are distributed across multiple shelves. The shelves may even be separated by significant distances (e.g. 70 meters) in order to provide greater site redundancy protection. Furthermore, by providing a separate control plane, each datapath can be entirely independent of every other datapath. In the preferred embodiment, the datapaths or fabrics are independent, and indeed, need not have any knowledge of each other.

Figure 4:
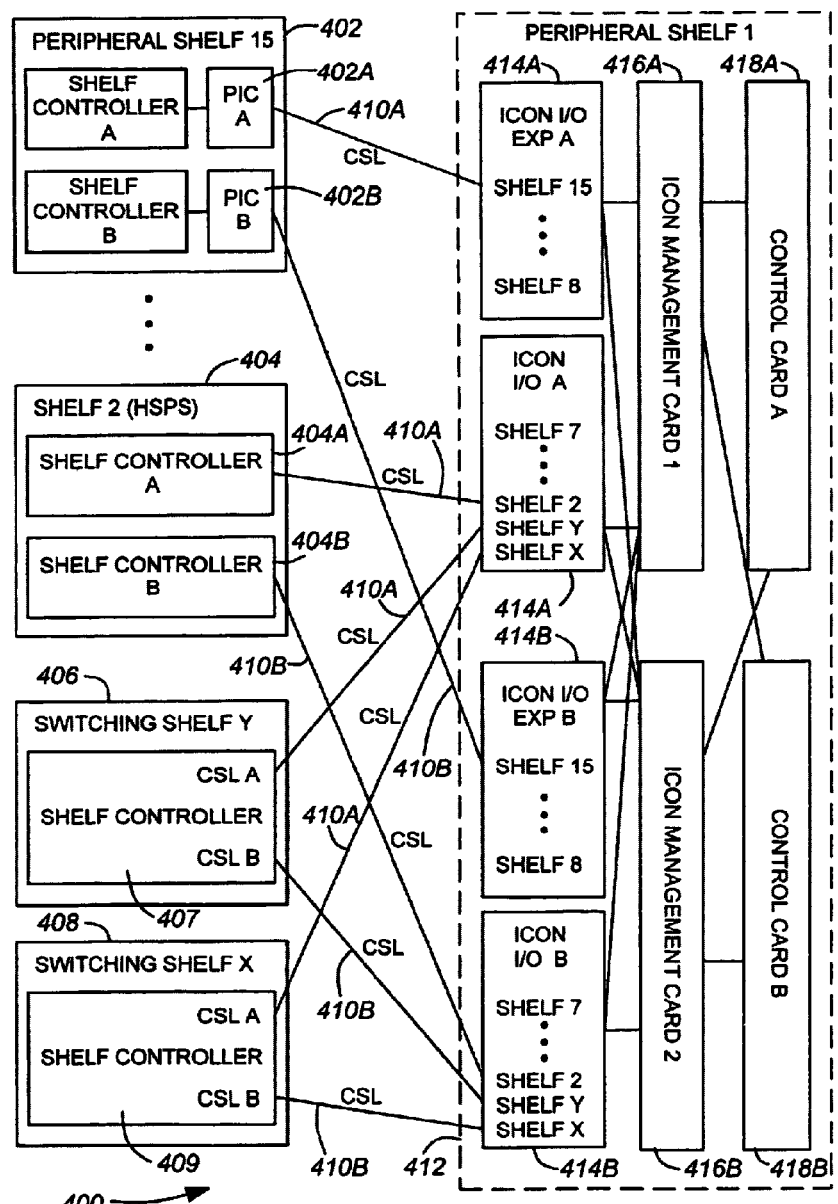
FIG. 4 is a block diagram showing fabric status flow across fabrics, in accordance with an embodiment, in the routing switch platform of FIGS. 2A–2C.

Details of the separate and independent control plane, and the distributed architecture of the fabric activity switch circuit 302, are now provided with reference to FIG. 4.

In FIG. 4, a block diagram generally referred to by reference numeral 400 shows how various peripheral devices are connected to the control shelf 412. As shown, each peripheral shelf (PS) 402 has a pair of redundant shelf controllers 402A and 402B each connecting the peripheral shelf 402 to a pair of redundant ICON I/O interface cards 414A, 414B, using CSLs 410A, 410B. Similarly, each high speed peripheral shelf (HSPS) 404 has a pair of redundant shelf controllers 404A and 404B each connecting the HSPS 404 to the pair of ICON I/O interface cards 414A, 414B, again using CSLs 410A, 410B. The CSLs 410A, 410B meet the link requirements outlined in section 3.0, above. Thus, with respect to the peripheral shelves, there is shelf controller redundancy as well as ICON I/O interface card redundancy.

Still referring to FIG. 4, a switching shelf Y 406 has a shelf controller 407 connecting the switching shelf Y 406 to each of a pair of redundant ICON I/O interface cards 414A, 414B. Also, a switching shelf X 408 has a shelf controller 409 connecting the switching shelf X 408 to each of the pair of redundant ICON I/O interface cards 414A, 414B. Switching shelf Y 406 and switching shelf X 408 each have a single shelf controller 407, 409 as each switching shelf X 407 and switching shelf Y 408 provides the other with redundancy. However, for further redundancy, it will be understood that each of each switching shelf X 407 and switching shelf Y 408 may have a plurality of shelf controllers 407, 409. The connection examples shown in FIG. 4 illustrate the flexibility in the architecture in accommodating many different types of peripheral devices and redundant connections. However, it will be understood the examples shown in FIG. 4 are not limiting. Many alternative designs are possible.

Still referring to FIG. 4, each of ICON I/O interface cards 414A and 414B are connected to first and second ICON management cards 416A and 416B, respectively. Furthermore, each of ICON I/O interface cards 414A and 414B may also be cross-linked to each of ICON management cards 416B and 416B, respectively, such that each ICON I/O interface card 414A, 414B have paths to each of ICON management cards 416A and 416B.

Each ICON management card 416A and 416B is in turn connected to redundant control cards 418A and 418B, respectively. As well, each ICON management card 416A and 416B may be cross-linked to control cards 418B and 418A, respectively, such that each ICON management card 416A and 416B has two paths to a control card 418A, 418B. Thus, it will be appreciated that the control plane itself has redundancy built therein with multiple paths between each peripheral component and one of the control cards 418A, 418B.

In summary, there is redundancy on two separate planes: (1) redundancy within the data plane between fabric X and fabric Y, and (2) redundancy within the control plane between control complex "A" and control complex "B". Either one of control complex "A" and control complex "B" may execute a fabric activity switch between fabric X and fabric Y, as each of control complex "A" and control complex "B" receive the same status information and otherwise have full capability to select a fabric based on internal switching logic.

While a control plane with redundancy has been shown and described, it will be appreciated that it is possible to have a control plane that does not have redundancy. An example was provided earlier with reference to FIG. 2A, which shows a single control complex 202.

3.3 Fabric Status Flow

Figure 5:
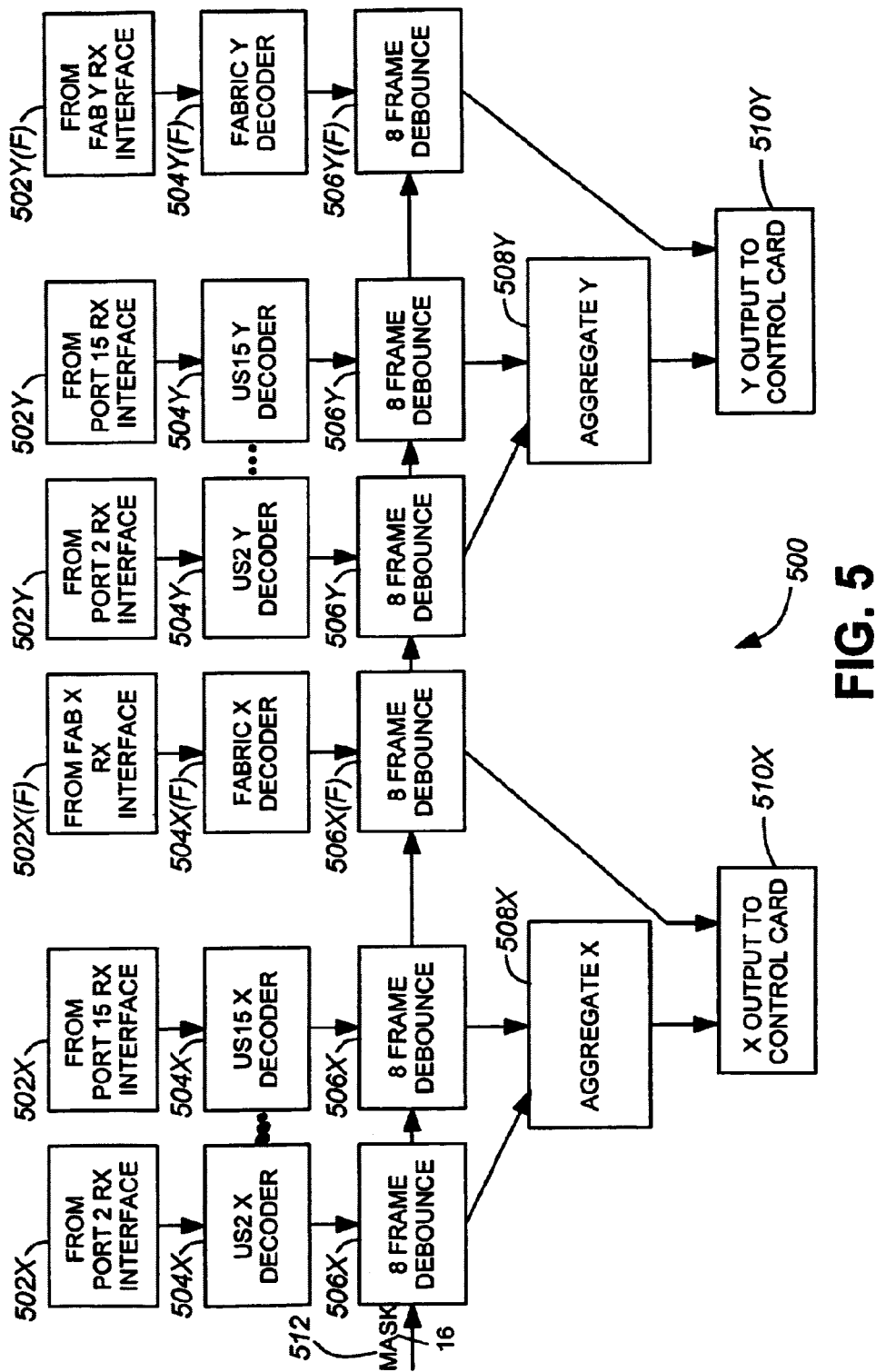
FIG. 5 is a flow chart showing aggregation of frame debounce counts in the fabric status flow across fabrics, in the routing switch platform of FIGS. 2A–2C.

Details on the flow of fabric status information from the peripheral shelves and switching shelves are now shown and described. As described earlier, the embodiment provides control status information for the configured switch in order to identify and track were the data error was reported. Referring to FIG. 5, a flow chart generally referred to by reference numeral 500 shows the fabric status flow within an ICON card 414A, 414B, as described in relation to FIG. 4 above. As shown in FIG. 5, signals from port interfaces on the ICON cards are shown in blocks 502X and 502Y. Signals from the port interfaces are received and, if encoded, decoded at blocks 504X and 504Y, respectively. The decoded signals are debounced at blocks 506X and 506Y, respectively, in order to reject spurious signals. This debouncing step is associated with status information being transmitted over the control signal lines 510A and 510B and is not associated with debouncing which occurs separately within the data plane.

Still referring to FIG. 5, a mask 512 is applied at each debouncing block 506X, 506X(F), 506Y, 506Y(F). Details of the mask 512, embodied in a circuit, are provided further below. The debounced signals resulting from blocks 506X, 506X(F) and 506Y, 506Y(F) are aggregated at blocks 508X and 508Y, respectively. In each case, the aggregation step comprises logically OR-ing the fabric status signals together. If one input status indicates a FAIL then the output from the aggregation is FAIL. The aggregate value from blocks 508X and 508Y are then provided as an X output 510X and a Y output 510Y, directed to a control card.

Still referring to FIG. 5, signals from the fabric interfaces are shown at blocks 502X(F) and 502Y(F). Signals from the fabric interface blocks 502X(F) and 502Y(F) are received and decoded at blocks 504X(F) and 504Y(F), respectively. The decoded signals are then debounced at blocks 506X(F) and 506Y(F), respectively, to screen spurious signals. The outputs of debouncing blocks 506X(F) and 506Y(F) are provided as inputs to X output block 51OX and Y output block 510Y, respectively. The status signals from the switching shelves 502X(F) and 502Y(F) are not included in the aggregation on the ICON because the redundant switching shelf information on the redundant mate ICON is needed to make any decisions on the switching shelf status. This will take place in hardware on the control card.

Each of output blocks 510X and 510Y provide status information to each of control complex A and control complex B shown earlier in FIG. 4.

3.4 Decoder Logic

Figure 6:
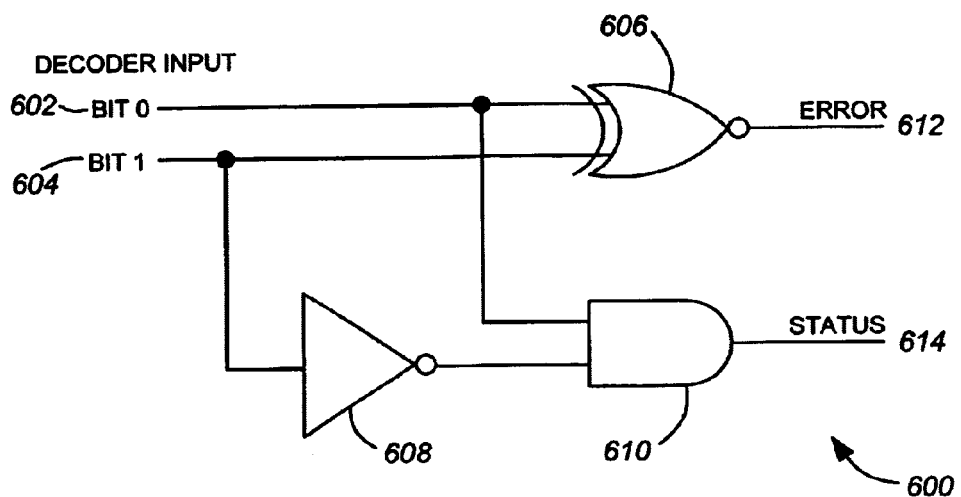
FIG. 6 is a schematic circuit diagram showing a decoder logic for decoding signals received by the fabric activity switch system of FIG. 3, in accordance with an embodiment.

Now, a possible hardware embodiment of the decoder 504X, 504X(F), 504Y, 504Y(F) is shown and described with reference to FIG. 6. In FIG. 6, a decoder circuit generally referred to by reference numeral 600 is shown. In the exemplary embodiment, the decoder circuit 600 is implemented in a field programmable gate array (FPGA) to decode the status of each fabric. The decoder circuit 600 in FIG. 6 shows an XNOR gate 606 receiving two inputs, comprising input bits 602 and 604. The decoder circuit 600 also has two outputs, namely, error output 612 and status output 614. Error output 612 is provided as an output from the XNOR logic gate 606. Bit 604 is also provided as an input to AND logic gate 610 after passing through a NOT function 608. Input bit 602 is provided as a second input to AND gate 610. The output from the AND gate 610 is the status output 614. When a trunk condition has occurred, i.e. when a valid data stream is terminated due to an error, the decoder circuit 600 will detect a parity error.

3.5 Mask Logic

Figure 7:
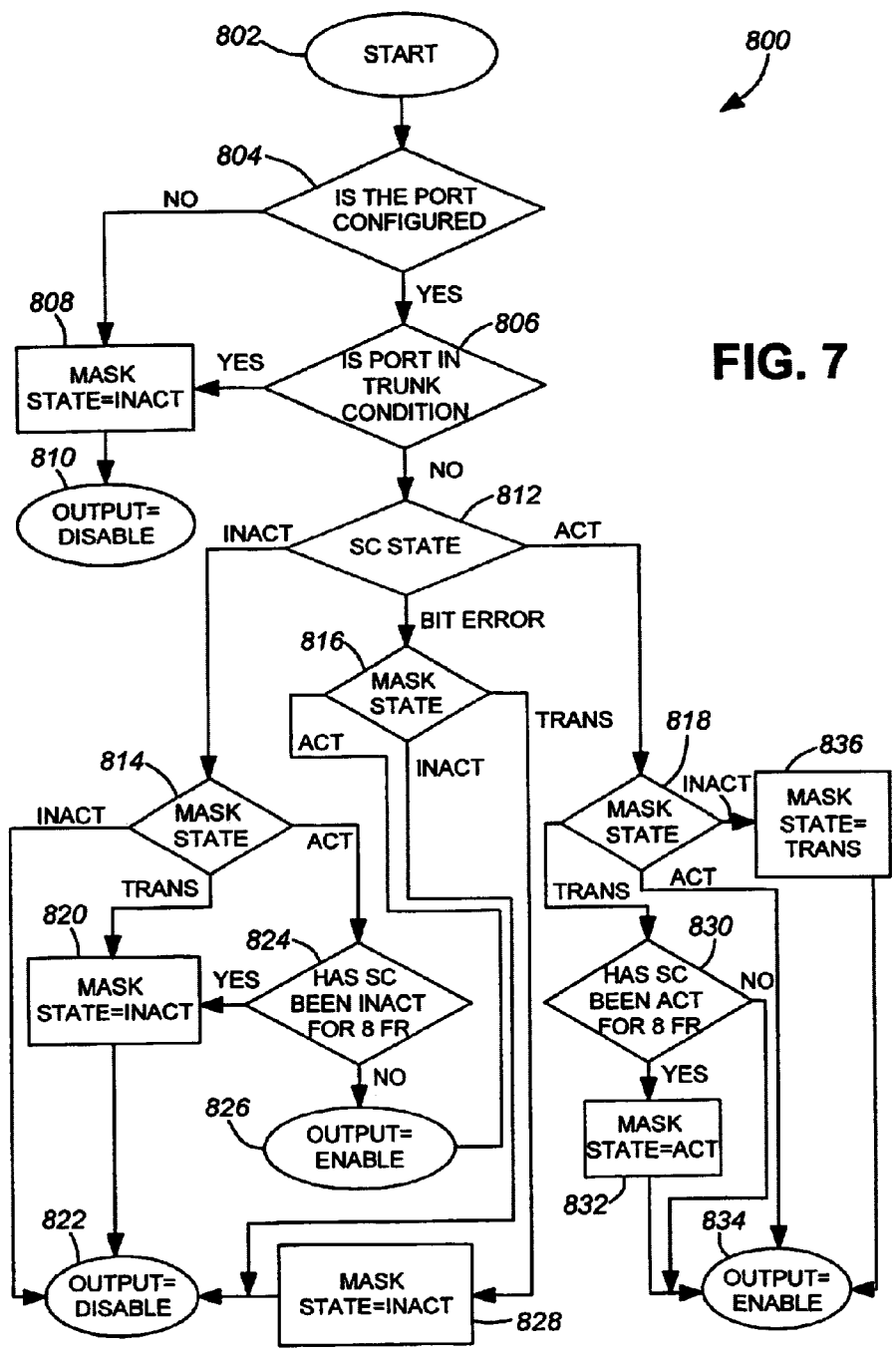
FIG. 7 is a flow chart showing a mask determination process for the fabric activity switch circuit, in accordance with an embodiment of FIG. 3.

Referring now to FIG. 7, shown is a flow chart of a mask process generally referred to by reference numeral 800. Inputs from each control service link (CSL) can be masked out so that only valid information is processed. In operation, the input mask is determined from the following:
 1) A register set by the control card to indicate the port has been configured.
 2) The CSL is operating (no trunk condition).
 3) The input is from the active shelf controller.

In an embodiment, three possible states of the masking function are INACT (inactive), TRANS (transition), and ACT (active). The INACT state is entered into when the port is not configured, the port is in trunk condition, the last state was ACT and the shelf controller becomes inactive for 8 frames, or the last state was TRANS and the shelf controller becomes inactive or a bit error was received. TRANS state is entered into when the shelf controller switches from inactive to active and has been active for less than 8 frames. This enables the debounce input for the corresponding fabric status to allow the shelf controller activity and fabric status inputs to be debounced in parallel. The ACT state is entered into when the shelf controller has been active for 8 frames, as discussed above.

The flow chart shown in FIG. 7 which implements this mask process is now described. The mask process starts at block 802 and proceeds to decision block 804. If the port is configured according to block 804, then the mask process 800 proceeds to decision block 806. Otherwise, the process proceeds to block 808. If the port is in trunk condition according to block 806, the process proceeds to block 808. Otherwise, the process 800 proceeds to decision block 812. If the process proceeds to block 808, the mask process 800 sets mask state=INACT and proceeds to block 810 where the process sets output=DISABLE and ends. If the mask process 800 proceeds to block 812, the mask process 800 looks the SC state to determine whether it is one of INACT (inactive), BIT ERROR, and ACT (active).

If the SC state is INACT, the mask process 800 proceeds to block 814. At decision block 814, the mask state will be one of INACT, TRANS, and ACT. Depending on the mask state, the mask process 800 proceeds to one of blocks 822, 820, and 824, respectively. Upon proceeding to block 822, the mask process 800 sets output=DISABLE and ends. At block 820, the mask process 800 sets mask state=INACT and then proceeds to block 822 as described above. At decision block 824, the mask process 800 determines whether the SC has been inactive for 8 frames. If yes, the mask process 800 proceeds to block 820 as described above. If no, the mask process 800 proceeds to block 826, sets output=ENABLE, and ends.

Still referring to FIG. 7, if the SC state at block 812 is BIT ERROR, then the system proceeds to decision block 816 which determines whether the mask state is one of ACT, INACT and TRANS. If the mask state is ACT the mask process 800 proceeds to block 826 as described above. If the mask state is INACT the mask process 800 proceeds to block 822 as described above. Finally, if the mask state is TRANS the mask process 800 proceeds to block 828, sets mask state=INACT, and then proceeds to block 822 as described above.

Still referring to FIG. 7, if the SC state at block 812 is ACT then the mask process 800 proceeds to decision block 818 which determines whether the mask state is one of TRANS, ACT and INACT. If the mask state is TRANS the mask process 800 proceeds to decision block 830 which determines whether the SC has been active for 8 frames. At block 830, if the SC has been active for 8 frames, the mask process 800 proceeds to block 832 which sets mask state=ACT. The mask process 800 then proceeds to block 834 which sets output=ENABLE, and ends. At block 830, if the SC has not been active for 8 frames, the mask process 800 proceeds directly to block 834 as described above. If the mask state at block 818 is ACT the mask process 800 proceeds directly to block 834 as described above. If the mask state at block 818 is INACT, the mask process 800 proceeds to block 836 which sets mask state=TRANS. The process then proceeds to block 834 as described above.

Figure 8:
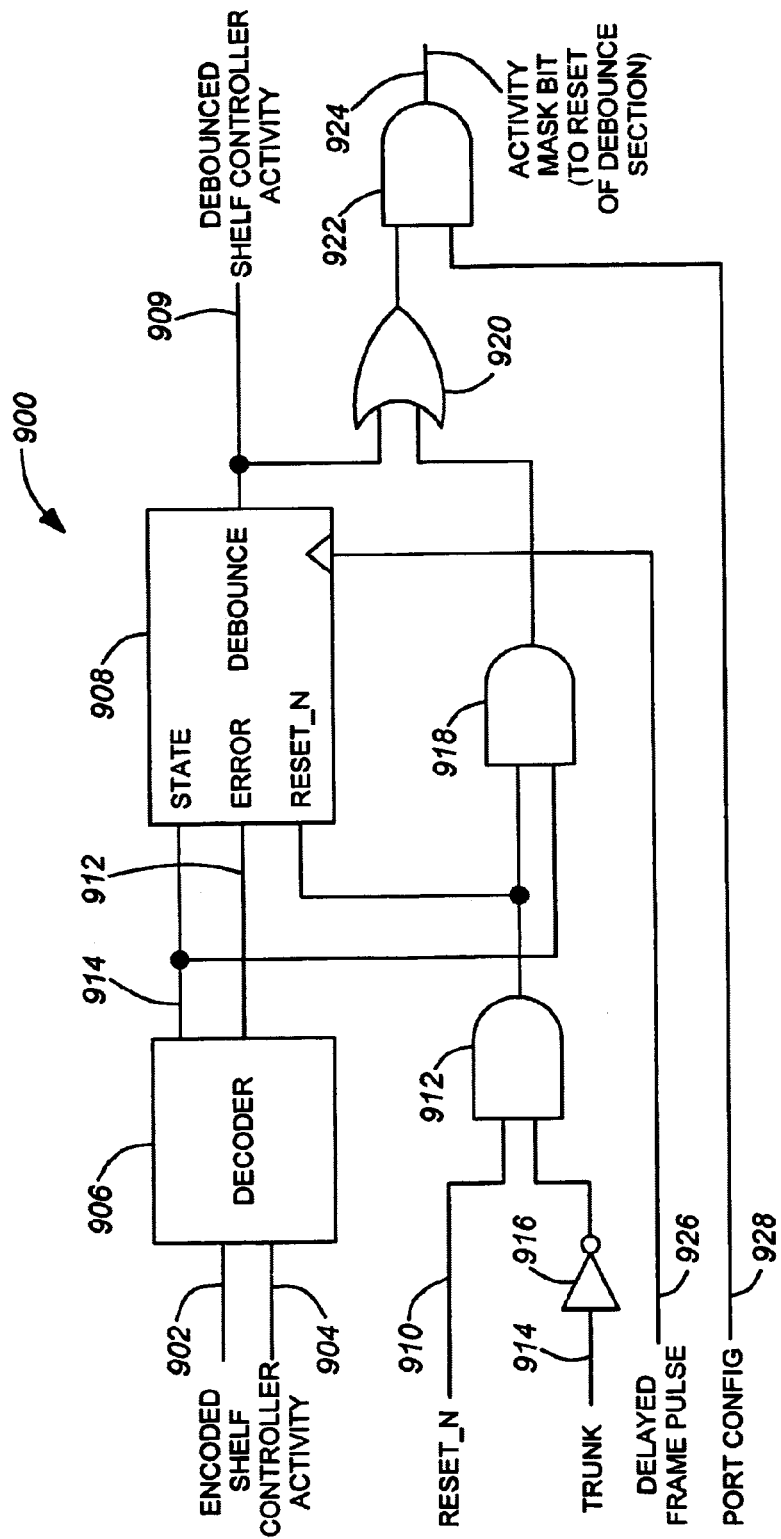
FIG. 8 is a schematic circuit diagram showing the mask logic, in accordance with an embodiment, for the mask determination process shown in FIG. 7.

A corresponding mask logic circuit 900 is shown in FIG. 8. Encoded shelf controller activity signals are provided at decoder inputs 902, 904 to a decoder 906. One possible embodiment of the decoder 906 is the decoding circuit 600 shown in FIG. 6. The decoder outputs, namely status output 914 and error output 912, are provided as inputs to a debounce module 908. Decoder status output 914 is also provided as an input to an AND logic gate 918. A second input to the AND gate 918 is provided by another AND logic gate 912. The AND gate 912 receives input from a reset signal 910 and a trunk signal 914 which first passes through a NOT function 916. The output from the AND gate 912 is also provided as a reset input to the debounce module 908. The output from the AND gate 918 is provided as an input to an OR logic gate 920. A second input to the OR logic gate 920 is provided by the output from the debounce module 908, namely the debounced shelf controller activity signal 909. The output from the OR gate 920 is provided as an input to an AND logic gate 922. A second input to the AND logic gate 922 is provided by a port configuration signal 928. The output from the AND gate 922 is provided as an activity mask bit 924 to reset the debounce section of the fabric activity switch circuit 302 (see FIG. 3).

The mask section also indicates the debounced status of the CSL activity. This status is indicated regardless of the port configuration. However no interrupt is generated when a CSL activity change occurs if the port is not configured. All fabric status information is now encoded (e.g. 1 bit+1 parity) and transmitted across a transmission link (e.g. ICSB) to each control card.

3.6 Transmission Protocol

Once the fabric activity switch circuit 302 has determined whether an activity switch is to occur, the following is a possible protocol for use in transmitting information from the control card 418A, 418B (FIG. 4) to each associated shelf in the system, in order to execute a fabric activity switch:

1. Transmitter broadcasts the Start bit to initialize the transmission.
2. Receivers recognize the start bit and listen for the message.
3. Transmitter sends the data as well as the cyclic redundancy check (CRC) of the data to receivers.
4. Receivers begin receiving data and generate the check sum from the data.
5. When the check sums are identical, receivers update the output and reset themselves to wait for the next transmission.
6. Transmitter terminates the transmission cycle and waits a certain period for the next transmission.

Message formats used in the transmission are shown in the following two tables. All fields in the messages are big-endian and are transmitted from MSB to LSB.

TABLE C

| Field (# of bit(s)) | Start (1) | Data (52) | CRC (8) |
|---|---|---|---|
| Transmit bit(s) | 1 | See data field below. | xxxxxxxx (depending on data) |

3.7 Transmission Hardware

Figure 9:
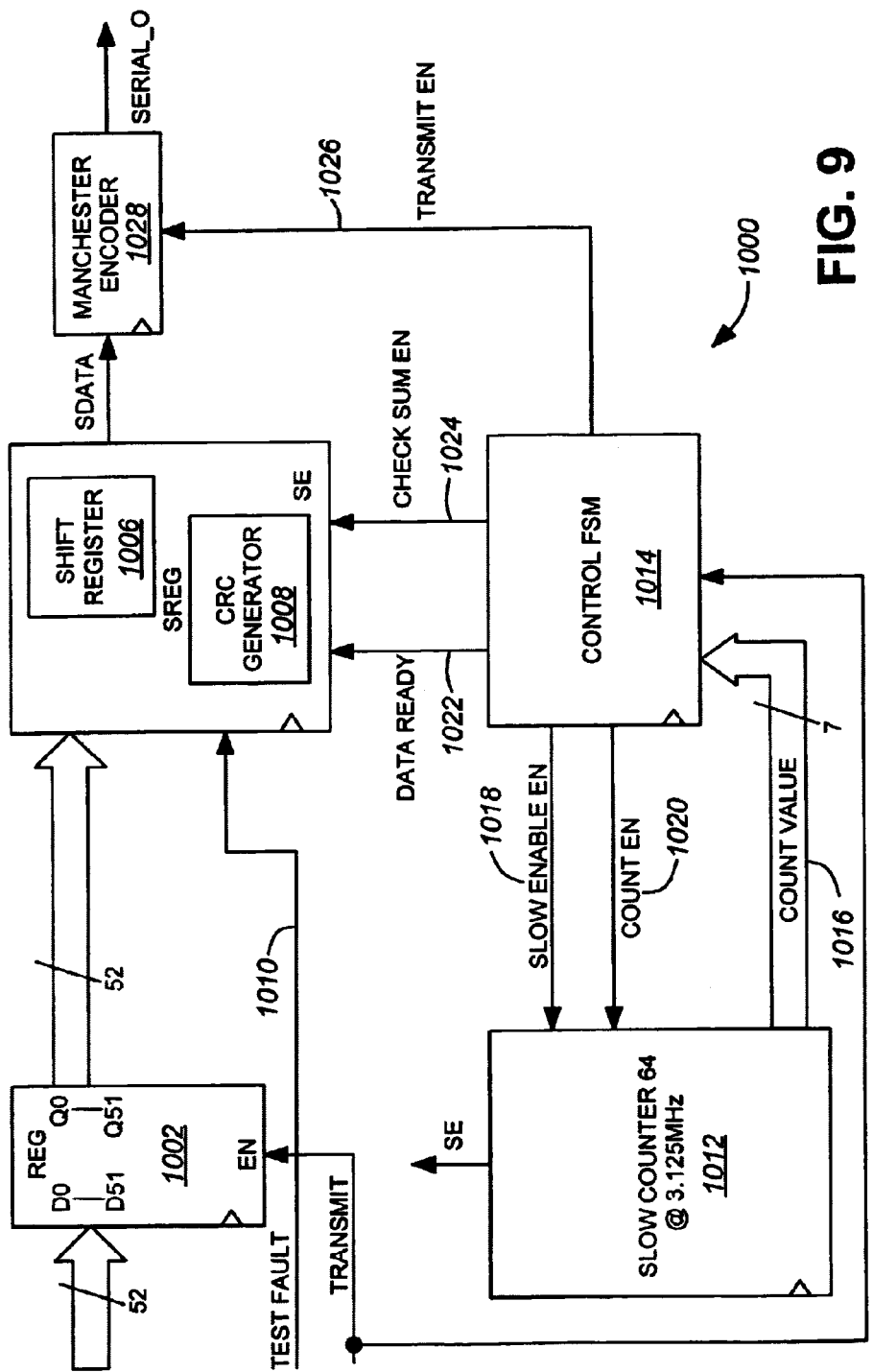
FIG. 9 is a schematic block diagram showing hardware circuit which transmits data from the fabric activity determination system and circuit, in accordance with the architecture shown in FIG. 3.

FIG. 9 shows a block diagram of an example of transmission hardware 1000 that may be used to transmit data to the system shelves according to the transmission protocol described above. The transmission hardware 1000, consists of the following blocks:

(i) Reg Module 1002

The Reg module 1002 stores data from the ICON for retransmission.

(ii) Sreg Module 1004

The Sreg module 1004 converts the parallel incoming data into serial output; as well it generates the CRC by the LFSR (Linear Feedback Shift Register) 1006 in the CRC Generator 1008. Note that the transfer function on the LFSR 1006 has to be identical to the LFSR 1006 in the receiver side when the TestFault input 1010 is low. TestFault input 1010 is used for testing the fault detection logic in the receiver side.

(iii) SlowCounter Module 1012

The slow counter module 1012 generates SE (slow enable) and is able to count up to 64. It allows Control FSM 1014 to change state based on the count value 1016.

(iv) Control FSM Module 1014

The control FSM module 1014 controls the process of the ICSB through multiple signals.

| | |
|---|---|
| SlowenableEn 1018 | Enables the SlowCounter 1012 to generate SE 1013. |
| CountEn 1020 | Enables the SlowCounter 1012 to count up. The counter always resets to 0 when the signal changes back to 0 |
| DataReady 1022 | Allows the Sreg 1004 to load in the input data. |
| CheckSumEn 1024 | Controls the multiplexer in SReg 1004 to transmit CRC from the LFSR 1006 when appropriate. |
| TransmitEn 1026 | Enable the Manchester Encoder 1028 to encode incoming bit when high and signals the module to raise the Serial 0 to logic one at the end of the transmission when low. |

(v) Manchester Encoder Module 1028

The Manchester encoder module 1028 converts binary bit (1 or 0) to Manchester binary bit (10 or 01). Manchester coding is characterized by the following: (a) data and clock signals are combined to form a single self-synchronizing data stream, (b) each encoded bit contains a transition at the midpoint of a bit period, (c) the direction of transition determines whether the bit is a "0" or a "1," and (d) the first half is the true bit value and the second half is the complement of the true bit value.

In an embodiment, the transmitter sends the same message five times across the link. There will be a small pause between each of the five messages and a long pause between message bundles.

TABLE D

| Data for Control FPGA | | | | | Data for SSU | |
|---|---|---|---|---|---|---|
| MSB | | | LSB | | MSB LSB | MSB LSB |
| Peripheral Shelf Status Aggregate X (2) | Peripheral Shelf Status Aggregate Y (2) | Switching Shelf Status X (2) | Switching Shelf Status Y (2) | Test Byte (8) | Primary Phase Word (18) | Alternative Phase Word (18) |

3.8 Control Card Hardware

Figure 10:
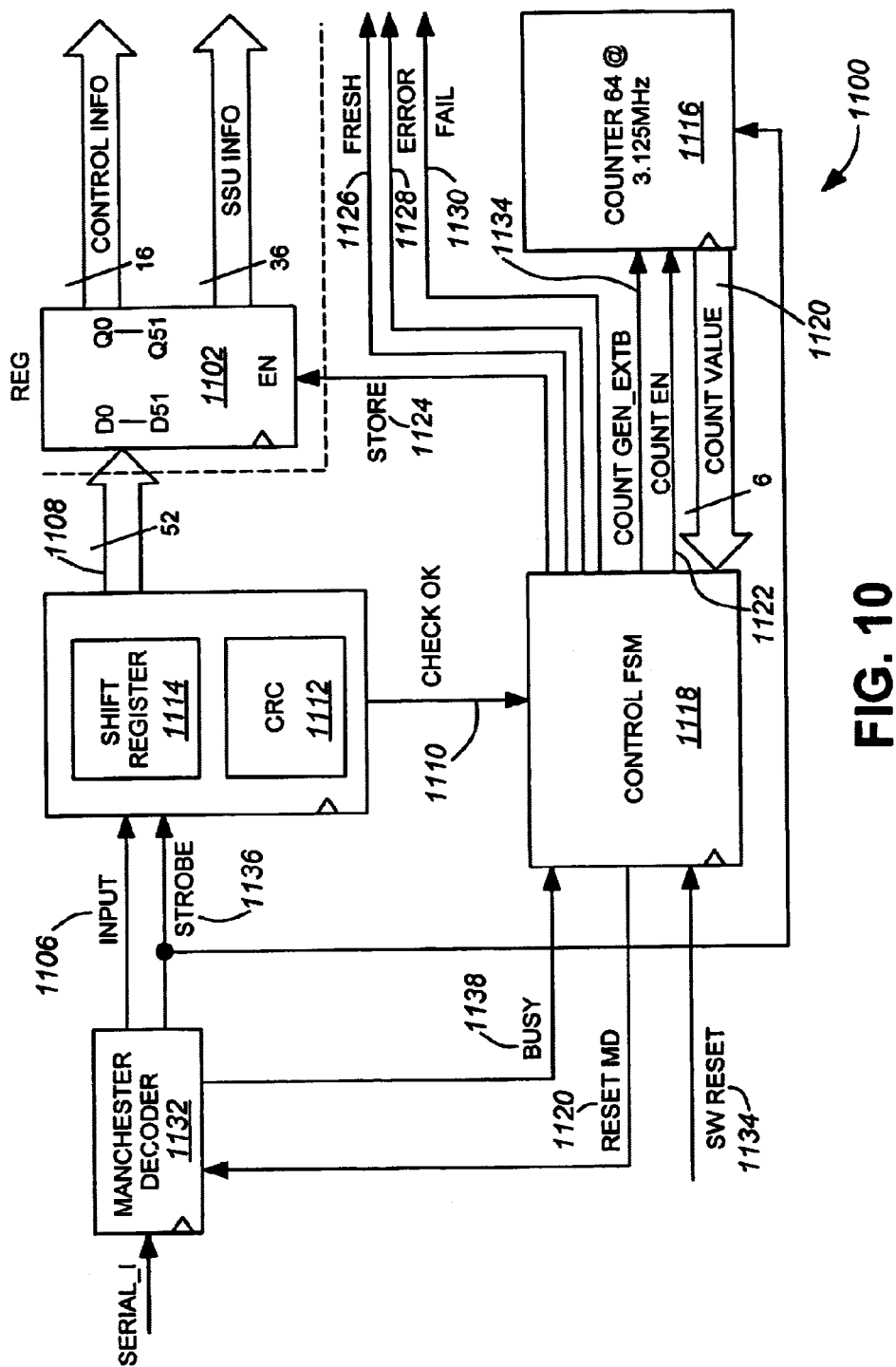
FIG. 10 is a block diagram showing the system synchronization unit and control card field programmable gate array used in the fabric activity determination system and circuit, in accordance with an embodiment of FIG. 3.

Now, receiver hardware compatible with the transmission hardware described above in reference to FIG. 9 is described in detail. Referring to FIG. 10, in an embodiment, the receivers for the ICSB for both ICONs are in the MPFPGA on the control card. In order to avoid faulty fabric switching, it is necessary to ensure that data transmitted by both ICONs belong to the same E1 frame. When the Fresh signal from both transmitters is set (i.e. both signals are current) then the control card FPGA can process the data. At the end of the fifth transmission, the receiver will set the Fresh signal low after certain delay. The indicator will be set to high in the next successful transmission from the ICON. If no valid data is received from an ICON then the Fail signal will be set. This will indicate that any data from this link should be ignored. FIG. 10 shows the hardware used for the receiver. The control card hardware generally referred to by reference numeral 1100 comprises the following blocks:

(i) Reg Module 1102

The Reg module 1102 stores data from Sreg 1104 when the data received by the receiver is valid. It is implemented by SSU or Control Card FPGA designer in order to minimize logic.

(ii) Sreg Module 1104

The SReg module 1104 converts the serial incoming data 1106 into parallel output 1108. It generates CheckOK 1110 to indicate the correctness of the data received. After the data and the received CRC pass through the CRC Generator 1112, the state of the LFSR 1114 should be zero. CheckOK 1110 becomes one when this happens. Note that the transfer function on the LFSR 1114 has to be identical to the LFSR in the transmitter side.

(iii) Counter Module 1116

The Counter 64 module 1116 is able to count up to 64. It allows Control FSM 1118 to change state based on the count value 1120.

(iv) Control FSM Module 1118

The Control FSM module 1118 controls the process of the ICSB through the following signals.

3.9 Timing Diagram

FIG. 11 shows the timing used by the transmitter and receiver described above with reference to FIG. 9 and FIG. 10, respectively. Referring to FIG. 11, a frame pulse+delay signal 1202 operating at 8 kHz, a SlowEn signal 1204 operating at 3.125 MHz, a corresponding signal in serial link 1206, and a Fresh signal 1208 generated by the receiver are all plotted in relation to each other. An enlarged view of each of these signals, 1202', 1204', 1206' and 1208', respectively, for one burst of the SlowEn signal 1204, is shown at the bottom of FIG. 11. The transmitters on both ICONS are aligned with SSYNC+known delay.

3.10 Hardware Architecture

Figure 12A:
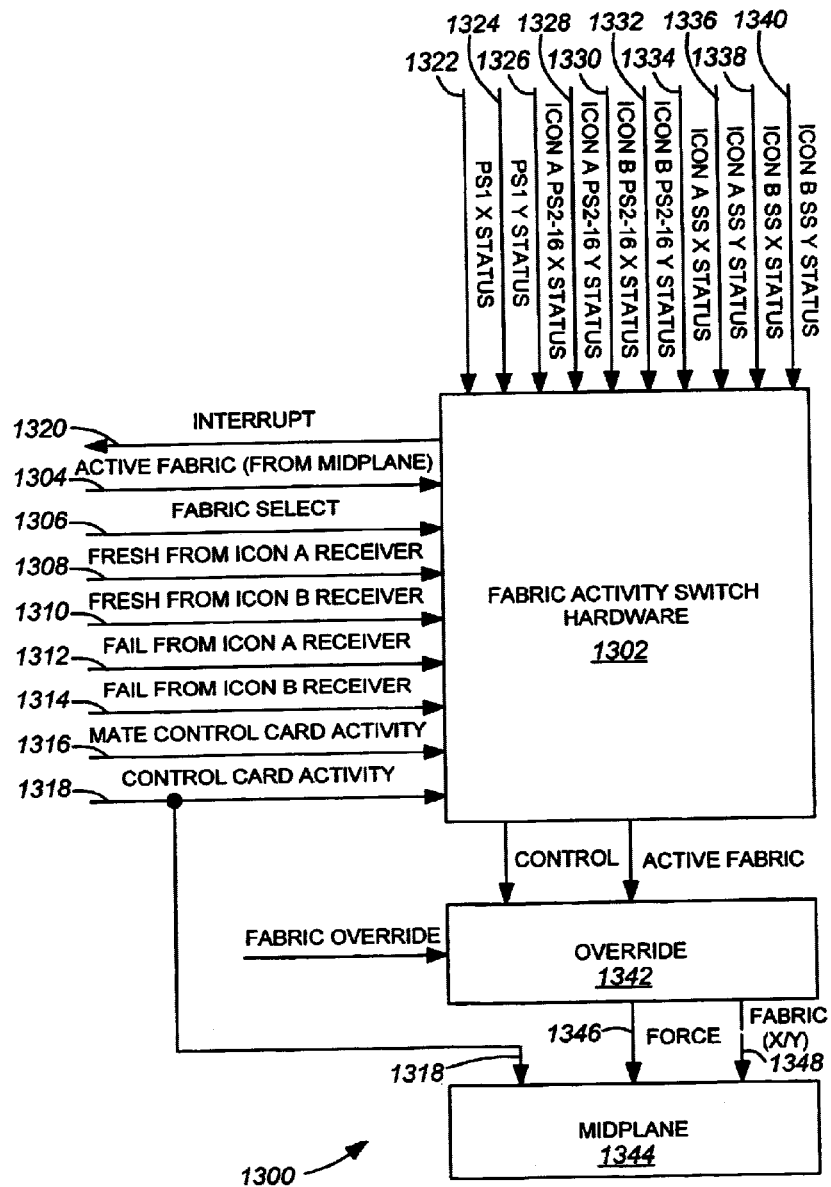
FIG. 12A is a block diagram showing details of the fabric activity switch circuit, in accordance with an embodiment of FIG. 3.
Figure 12B:
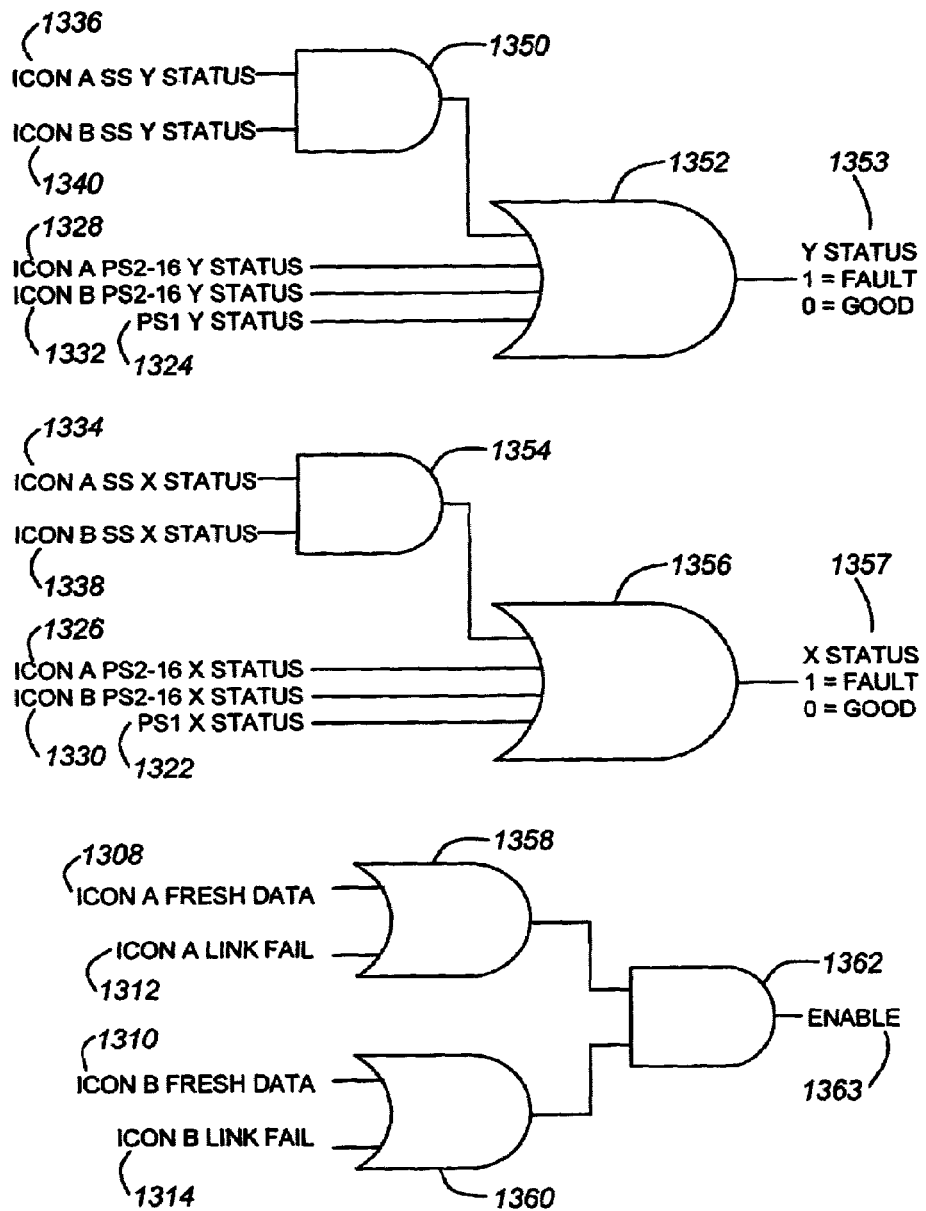
FIG. 12B is an expanded view of the fabric activity switch hardware, in accordance with an embodiment of FIG. 12A.
Figure 12C:
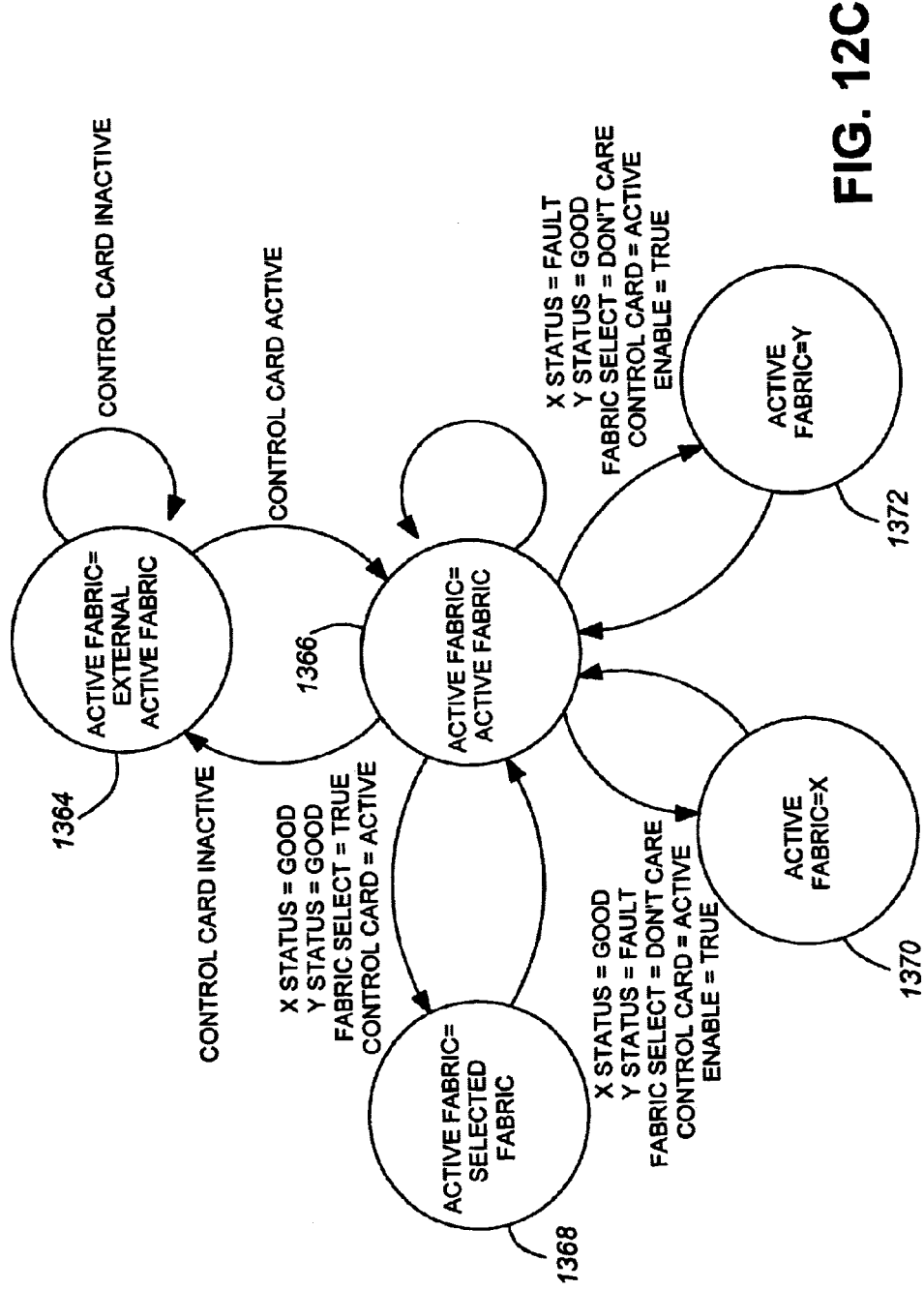
FIG. 12C is a state diagram corresponding to the fabric activity switch hardware of FIGS. 12A and 12B.

Now, the hardware architecture for a fabric activity determination circuit 302 (FIG. 3) in accordance with an embodiment is shown and described. Referring to FIGS. 12A–12C, a fabric activity switch circuit, generally referred to by reference numeral 1300, can operate in several states:

1) Mate control card is active, own control card is inactive.

The fast activity decision circuit 1302 will ignore all status inputs and fabric select and align to the active fabric. Software will still be able to override the output but as no fault detection is done on the input fabric status, hardware will never set override.

2) Own control card is active and mate control card is inactive.

In this case, the circuit operates in normal mode.

3) Both control cards are active or inactive.

In the case of both control cards being active or inactive the PFICs will disregard any fabric activity signals from the control cards and latch the last current value. The case of having both control cards active is an invalid state and, for this situation, it is best to let the circuits align according to their own inputs. In the case of both control cards being inactive, one card should become active shortly. For this situation, it is also best to let the circuit align according to its own inputs.

| | |
|---|---|
| ResetMD 1120 | Reset the Manchester Decoder 1132 when the receiver is reset by software through SWResetor 1134 when a message does not have the right length in a time slot. |
| CountEn 1122 | Enables the SlowCounter 1116 to count up, the counter 1116 always resets to zero when counter 1116 changes back to zero. CountGen_Extb 1134 signals the counter 1116 to count up by strobe or count up by every 8 cycle of the 25 MHz clock. |
| Store 1124 | Enables the Reg 1102 to store data from the Sreg 1104. |
| Fresh 1126 | The up to date indicator to prevent races of two ICONS' data. |
| Error 1128 | One clock cycle pulse to indicate message in any single time slot has error (CRC fail). |
| Fail 1130 | Uses a level to indicate the receiver does not receive any data and waits longer than the longest idle time or all the five CRCs fail. This value is cleared when valid data is received. |

(v) Manchester Decoder Module 1132

The Manchester Decoder module 1132 creates Strobe 1136 for the Receiver to read in data at the predetermined rate. Also it creates Busy 1138 to indicate incoming transmission in the ICSU link for the Control FSM 1118.

Although the statuses are encoded (e.g. 1 bit+1 parity), they can be decoded without the need for error detection. Any error that occur in the data stream should be detected by the ICSB receiver module and actions taken accordingly.

3.10.1 Inputs to Fabric Activity Switch Hardware

Still referring to FIGS. 12A–12C, the inputs to the fabric activity switch hardware 1302 are combined in the following way:

1) Status inputs from PS I are always current.
2) The circuit will process input only when:
   a) Both ICONs indicate current data (i.e. both FRESH from ICON A receiver 1308 is asserted and FRESH from ICON B receiver 1310 is asserted.)
   b) One Icon indicates current data (i.e. FRESH from ICON A 1308 or FRESH from ICON B 1310) and one ICON indicates a FAIL (i.e. FAIL from ICON B 1314 or FAIL from ICON A 1312). The status and FRESH inputs from the fail ICON will be ignored. The circuit will only wait for the FRESH input from the functioning ICON.

c) Both ICONS indicate a FAIL (i.e. both FAIL from ICON B 1314 is asserted and FAIL from ICON A 1312 is asserted). This will cause the switching shelves to indicate a FAIL condition and place the circuit in override.

3) Both X or Y switching shelf inputs from a switching shelf must indicate FAIL for the switching shelf to be considered failed. If only one input indicates FAIL then it can be presumed that one of the redundant links between the switching shelf and control card has failed and not the switching shelf itself.

4) All X status signals 1322, 1326, 1330, 1334, 1338 are OR'ed together and all Y status signals 1324, 1328, 1332, 1336, 1340 are OR'ed together. If any input indicates a FAIL then the result is FAIL.

FIG. 12B is a logic diagram showing how inputs to the fabric activity switch hardware 1302 are combined. Corresponding inputs are labelled using the same reference numerals as in FIG. 12A. As shown, AND gate 1350 receives Y fabric status inputs 1336 and 1340. The output from AND gate 1350 is an input to OR gate 1352. The OR gate 1352 also receives input from various Y fabric status inputs 1328, 1332 and 1324. The output from OR gate 1352 is the Y status 1353.

Similarly, AND gate 1354 receives X fabric status inputs 1334 and 1338 and provides an output to OR gate 1356. The OR gate 1356 also receives X fabric status inputs 1326, 1330 and 1322 and provides an output which is the X status 1357.

Still referring to FIG. 12B, OR gate 1358 receives input from ICON A including a fresh data signal 1308 and a link fail signal 1312. Another OR gate 1314 receives input from ICON B including a fresh data signal 1310 and link fail signal 1314. The two OR gates 1358, 1360 provides outputs which are inputs to an AND gate 1362. The output from the AND gate 1362 is an enable signal 1363.

FIG. 12C is a corresponding state diagram which shows how the active fabric is selected based on the status of fabric X and fabric Y. Various states 1364, 1366, 1368, 1370, 1372, of the active fabric are shown with paths between the states showing an event which will cause a change in state. Thus, based on the logic described in FIG. 12B and the state diagram shown in FIG. 12C, an active fabric is selected.

After a fault has been detected, a fabric switch will occur if necessary, and then the circuit will be placed in override 1342. When the circuit is placed in override 1342 by either hardware or software, the current fabric activity will be latched. An interrupt 1320 will be generated whenever the circuit enters an override state.

3.10.2 Signals from Control Cards to FICs

Still referring to FIGS. 12A–12C, the Fabric 1348 and control card activity is then passed to the midplane 1344 having the FICs.

Each FIC drives a fabric INSERVICE line out to the rest of the shelf (FIC X drives X_INSERVICE, FIC Y drives Y_INSERVICE) to indicate which fabric is active. The INSERVICE lines are set using the control card activity and active fabric from the control card. The FICs will only use the active fabric line from the active control card. If fabric X is active then FIC X will assert X INSERVICE, if fabric Y is active then FIC Y will assert Y INSERVICE. If both control cards are active or inactive then both FICs will latch their last current INSERVICE value. Both the active fabric and control card activity are debounced on the FICs to prevent false switches. The INSERVICE lines are distributed to line cards and ICON. The line cards terminate these signals for their own use while the ICON passes the active fabric to the rest of the system.

3.11 ICON Transmit Hardware

Figure 13:
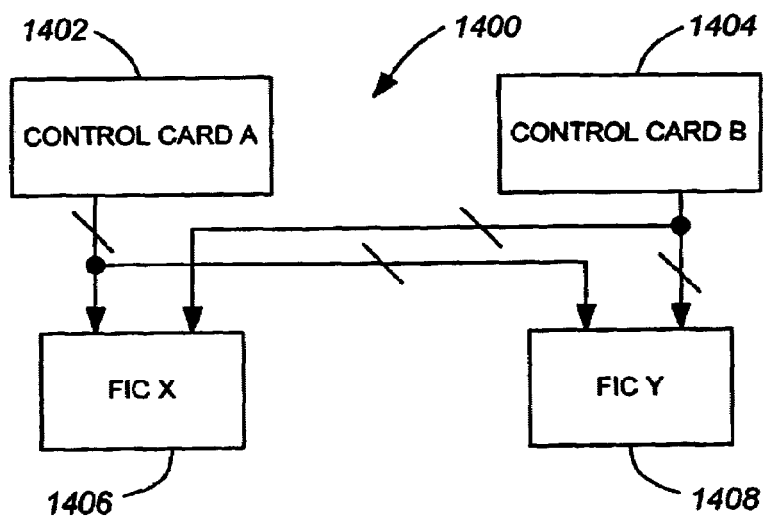
FIG. 13 is a block diagram showing signals from the control cards to fabric interface cards (FICs) in the fabric activity switch circuit, in accordance with an embodiment of FIG. 3.

The INSERVICE signals are tracked from the midplane connector to the ICON FPGA. FIG. 13 shows the path from the control cards 1402, 1404 to the FICs 1406, 1408, then to the ICON and, finally to the FPGA. If both INSERVICE inputs are active or inactive then the FPGA will latch the last valid active fabric.

Figure 14:
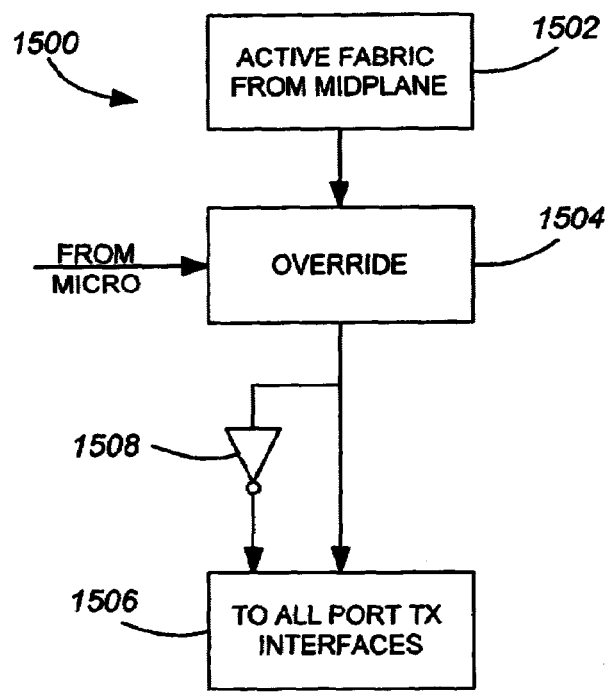
FIG. 14 is a block diagram showing an inter-shelf connection (ICON) field programmable gate array (FPGA) active fabric flow as used in the fabric activity determination circuit, in accordance with an embodiment of FIG. 3.

As shown in FIG. 14, software has the option to override the active fabric distributed across all other shelves. At block 1502, individual signals that come from the FIC X 1406 and FIC Y 1408 (FIG. 13) are taken from the midplane. If both are active, or both are inactive, then the last valid state is kept. At block 1504, software is able to override the midplane values in case the FICs are missing or at fault. In one embodiment, a key is used to engage the override circuit. The control card will hold the key value and pass it to the ICON at block 1506 when override is to be engaged. NOT gate 1508 encodes one bit to one bit plus an odd parity bit.

Typically, this option should be used when a fault has been detected in the INSERVICE lines from the FICs. The active fabric is encoded and passed to a timeslot assignor in the FPGA. The timeslot assignor sends the data from the ICON FPGA to the CSLs. The transceivers send the active fabric to all peripheral and switching shelves in timeslot 6.

3.12 CSL Terminating on a Switching Shelf

Transceivers on the switching shelf terminate the CSL and pass the data across an ST-like bus to a timeslot assignor inside an FPGA. The assignor looks for trunk conditioning using the same methods as the ICON. The FPGA decodes, debounces and stores active fabric as described above. When a fabric switch occurs the FPGA interrupts the processor.

3.13 CSL Terminating on a Peripheral Shelf (50G)

The CSL connects to the PIC on a peripheral shelf. The CSL is tracked from the FIC across the midplane to the control card and terminates on the timing module. The transceiver on the timing module recovers the data from the CSL and passes it to a timeslot assignor in the FPGA across an ST-like bus. The assignor looks for trunk conditioning using the same methods as the ICON. The FPGA decodes, debounces and drives the active fabric from the timing module to the MPFPGA on the control card. The MPFGPA then drives active fabric to the FICs, and the FICs drive it to the line cards. This is done in the same manner as described above for PS1. The line cards are the termination point for fabric activity.

3.14 CSL Terminating on a HSPS

The CSL connects to and terminates on the universal shelf controller. A transceiver recovers the data from the CSL and passes it to a timeslot assignor in the FPGA across an ST-like bus. The assignor looks for trunk conditioning using the same methods as the ICON. The FPGA decodes and debounces the fabric activity. The information is encoded with a toggling signal, and transmitted to CPLDs on the brick midplanes. The CPLD retransmits the toggling signal to the line cards. The line cards are the termination point of the fabric activity. They decode the fabric activity depending on the frequency of the toggling signal.

It is noted that those skilled in the art will appreciate that various modifications of detail may be made to the present embodiment, all of which would come within the scope of the invention. In particular, while the exemplary embodiment described above describes two fabrics or datapaths, it will be appreciated that there may be more than two fabrics or datapaths providing additional redundancy. In such a case, it would be possible to effect a hardware switch upon a second fault as long as there is still a fault-free redundant fabric available. It will be understood that the details of the activity switch mechanism can be adopted to a multi-fabric embodiment comprising three or even more fabrics.

We claim:

1. A system for controlling switching fabrics in a communications switch platform having a data plane for processing data, including an active fabric having an ingress and an egress and establishing a first datapath, a redundant fabric having an ingress and an egress and establishing a second datapath, and a fabric switch selecting one of said fabrics to a system output, comprising:
a control plane for monitoring said processing of data, including: (i) a plurality of monitors operatively connected to monitor the status of elements in said active and redundant fabrics in the data plane; and (ii) a first fabric activity switch circuit adapted to determine whether said fault occurred in said active fabric, and if so, to generate a fabric activity switch signal directed to said fabric switch to switch to said redundant fabric, whereby, the control plane receives data plane fabric status inputs from the data plane and effects control over said fabric switch, but otherwise operates independently of said data plane;
a redundant fabric activity switch circuit which in the event of failure of said first fabric activity switch circuit, is adapted to determine whether said fault occurred in said active fabric in the data plane, and if so, to generate a fabric activity switch signal directed to said fabric switch, whereby, redundant control is provided over said fabric switch;
a plurality of redundant monitors operatively connected to monitor the status of said first fabric and said redundant fabric for a fault, whereby, redundant reporting paths are provided in the control plane for the status of said first and said redundant fabrics; and,
wherein said plurality of monitors and redundant monitors comprise a pair of shelf controllers per shelf, and each monitor and each redundant monitor of each pair of shelf controllers is connected by respective control service links to a first inter-shelf I/O interface card and a second inter-shelf I/O interface card, respectively, whereby shelf status information is provided across shelves to redundant I/O interfaces.

2. The system in claim 1, further comprising first and second inter-shelf management cards, each of said first and second inter-shelf management cards being cross-connected to each of said first and second inter-shelf I/O interface cards, whereby, multiple redundant paths are provided between said pairs of shelf controllers and said inter-shelf management cards.

3. The system in claim 2, further comprising first and second fabric activity switch control cards, each of said first and second fabric activity switch control cards being cross-connected to each of said first and second inter-shelf management cards, whereby, multiple redundant paths are provided between said pairs of shelf controllers and said fabric activity switch control cards.

4. The system in claim 3, further comprising a fabric override input adapted to generate a fabric activity switch signal directed to said fabric switch in the data plane, whereby, the selection of a fabric by the fabric activity switch circuit may be overridden.

5. The system in claim 1, further comprising a fabric override input adapted to generate a fabric activity switch signal directed to said fabric switch in the data plane, whereby, the selection of a fabric by the fabric activity switch circuit may be overridden.

6. The system in claim 2, further comprising a fabric override input adapted to generate a fabric activity switch signal directed to said fabric switch in the data plane, whereby, the selection of a fabric by the fabric activity switch circuit may be overridden.

7. A system for controlling switching fabrics in a communications switch including a plurality of input/output ("I/O") shelves interfacing with a first switching fabric and a second switching fabric, for selecting one of said first and second fabrics as an active switching fabric, comprising:
an I/O monitor provided in an access interface between each I/O shelf and the first and second switching fabrics, respectively, for generating respective first and second fabric status signals indicative of a fault on the access interface;
means in the first and second fabrics for generating respective first and second switching fabric status signals, indicative of a fault in one of the first and second switching fabrics, respectively; and,
a fabric activity switch circuit for selecting the first switching fabric as the active switching fabric if a fault is detected in the second switching fabric based on the first and second fabric status signals and the first and second switching fabric status signals.

8. The system of claim 7 further comprising an interface, coupled to the fabric activity switch circuit, for receiving at least one of an override signal for overriding the selecting of the active switching fabric and a select signal for directing the selecting of the active switching fabric.

9. The system of claim 8 wherein at least one of the override and select signals are provided by a control terminal.

10. The system of claim 7 wherein the selecting of the active switching fabric occurs in under 60 milliseconds.

11. A fabric activity switch circuit for a communications switch, the communications switch including at least one input/output ("I/O") device coupled to each of first and second switching fabrics, the circuit comprising:
a first interface for receiving first and second I/O status signals from the at least one I/O device, the first and second I/O status signals being indicative of respective faults in the first and second switching fabrics and being generated by respective monitors provided in the at least one I/O device;
a second interface for receiving first and second fabric status signals from the first and second switching fabrics, respectively, the first and second fabric status signals being indicative of respective faults in the first and second switching fabrics and being generated by respective monitors provided in the first and second switching fabrics;
gates coupled to the first and second interfaces for generating an output signal for selecting the first switching fabric as an active switching fabric if a combination of the second I/O and fabric status signals indicate a fault in the second switching fabric and for selecting the second switching fabric as the active switching fabric if a combination of the first I/O and fabric status signals indicate a fault in the first switching fabric.

12. The fabric activity switch circuit of claim 11 further comprising a third interface coupled to the gates for transmitting the output signal to a fabric switch for switching between the first and second switching fabrics.

13. The fabric activity switch circuit of claim 12 further comprising redundant gates and redundant first, second, and third interfaces to improve reliability.

14. The fabric activity switch circuit of claim 11 further comprising a fourth interface, coupled to the gates, for receiving at least one of an override signal for overriding the selecting of the active switching fabric and a select signal for directing the selecting of the active switching fabric.

15. The fabric activity switch circuit of claim 14 wherein at least one of the override and select signals are provided by a control terminal.

16. The fabric activity switch circuit of claim 11 wherein the switching between the first and second switching fabrics occurs in under 60 milliseconds.

* * * * *

UNITED STATES PATENT AND TRADEMARK OFFICE
CERTIFICATE OF CORRECTION

| | | |
|---|---|---|
| PATENT NO. | : 7,099,271 B2 | Page 1 of 1 |
| APPLICATION NO. | : 10/015576 | |
| DATED | : August 29, 2006 | |
| INVENTOR(S) | : Larry Friesen et al. | |

It is certified that error appears in the above-identified patent and that said Letters Patent is hereby corrected as shown below:

Claim 1, column 23, line 31: Insert a comma -- , -- after the word "which".

Signed and Sealed this

Twentieth Day of March, 2007

JON W. DUDAS
*Director of the United States Patent and Trademark Office*